United States Patent
Hashimoto et al.

(10) Patent No.: US 6,251,018 B1
(45) Date of Patent: Jun. 26, 2001

(54) DAMPENING DISK ASSEMBLY WITH SPRING RETAINING PLATE

(75) Inventors: Hideki Hashimoto, Katano; Takeshi Noguchi, Neyagawa; Naohiko Takahashi, Ibaraki, all of (JP)

(73) Assignee: Exedy Corporation, Osaka (JP)

( * ) Notice: Subject to any disclaimer, the term of this patent is extended or adjusted under 35 U.S.C. 154(b) by 0 days.

(21) Appl. No.: 09/291,968

(22) Filed: Apr. 15, 1999

(30) Foreign Application Priority Data

Apr. 17, 1998 (JP) ................................................. 10-108348

(51) Int. Cl.[7] ........................................................ F16D 3/12
(52) U.S. Cl. ................................. 464/68; 464/63; 464/64; 464/68; 192/205; 192/213.21; 192/213.1
(58) Field of Search .......................... 74/574; 192/213.2, 192/213.21, 213.22, 213.1, 213.12, 203, 205; 464/63, 64, 66, 67, 68

(56) References Cited

U.S. PATENT DOCUMENTS

| | | | |
|---|---|---|---|
| 3,628,353 | * 12/1971 | Armstrong | ............................. 464/68 |
| 4,559,024 | * 12/1985 | Tamura et al. | ......................... 464/63 |
| 4,560,054 | 12/1985 | Kayanoki et al. . | |
| 4,569,430 | * 2/1986 | Raab et al. | ...................... 192/213.31 |
| 4,577,742 | 3/1986 | Saida . | |
| 4,585,428 | 4/1986 | Asada . | |
| 4,586,595 | 5/1986 | Hartig et al. . | |
| 4,643,288 | 2/1987 | Tomm et al. . | |
| 4,669,595 | 6/1987 | Fischer et al. . | |
| 4,684,007 | 8/1987 | Maucher . | |
| 4,966,269 | 10/1990 | Raab et al. . | |
| 4,998,608 | 3/1991 | Raab et al. . | |
| 5,238,096 | 8/1993 | Ament et al. . | |
| 5,246,398 | 9/1993 | Birk et al. . | |
| 5,813,915 | * 9/1998 | Imanaka | ................................. 464/68 |
| 5,857,552 | * 1/1999 | Hashimoto | ...................... 192/213.21 |
| 5,893,446 | 4/1999 | Honjo et al. . | |
| 6,056,103 | * 5/2000 | Hashimoto et al. | ............ 192/213.12 |

FOREIGN PATENT DOCUMENTS

2093950 * 9/1992 (GB) ...................................... 464/68

* cited by examiner

Primary Examiner—Lynne H. Browne
Assistant Examiner—Aaron Dunwoody
(74) Attorney, Agent, or Firm—Shinjyu Global IP Counselors, LLP

(57) ABSTRACT

A clutch disk assembly (1) is provided between an input shaft and an output shaft to selectively transmit rotation therebetween. The clutch disk assembly (1) is provided with a dampening mechanism (4) to provide smooth transition during engagement and disengagement of the clutch disk assembly. The dampening mechanism (4) has a more durable second retaining plate (32) with a rectangular window portion for transmitting torque. This second retaining plate (32) has a second receptacle (36) to support a first spring (16). The second retaining plate (32) includes a disk-like plate main body. The second receptacle (36) is formed from that plate main body. The second receptacle (36) projects in an axial direction from the plate main body. The second receptacle (36) includes an axially supporting part (36a) and a circular supporting part (36b). The axially supporting part (36a) supports an axially outside part of the first spring (16) and continues in a radial direction. The circular supporting part (36b) supports both end parts of the first spring (16), and is formed on both circular ends of the axially supporting part (36a). A second hole (36f) is formed at both corners of an inner circumferential side of the axially supporting part (36a). The second holes (36f) are elongated holes that extend in a radial direction.

35 Claims, 21 Drawing Sheets

DAMPENING DISK ASSEMBLY WITH SPRING RETAINING PLATE

BACKGROUND OF THE INVENTION

1. Field of the Invention

This invention generally relates to the retaining plates of a dampening disk assembly, which is used in a clutch of a motorized vehicle. More specifically, the present invention relates to the holes formed in plates, which are located adjacent, the rectangular windows such that these holes reduce wear and increase life span of the plate.

2. Background Information

In general, a clutch disk assembly or dampening disk assembly is used in a clutch of a vehicle. The dampening disk assembly includes an input portion connected with a flywheel on an engine side, and a spline hub connected with a shaft extending from a transmission. The input portion and the spline hub are coupled in a circular direction by a dampening mechanism. The dampening mechanism includes a plurality of coil springs. The input portion includes a friction facing pressed by a flywheel and a pair of disk like plates. The spline hub includes a boss part in which the shaft from the transmission is inlayed, and a flange extending to an outer circumferential side of the boss part. Window holes are formed in the flange, and within each window hole is an elastic portion such as a coil spring. The two plates have rectangular windows (spring supporting part), which are formed by punching and cut and lift in an axial direction, at locations corresponding to the coil springs. These rectangular windows have convex shapes, which are formed by a drawing method. Both circular end parts of the rectangular windows touch both end parts of the coil springs, and operate as a connecting part for transmitting torque therebetween. In addition, the rectangular windows operate as spring casings to seat the coil springs and regulate the coil springs movements in both axial and radial directions.

The rectangular windows (tunnel-type) are formed in the plate main body by drawing, so as to be a convex shape continuing in a radial direction and having a large area which the coil spring touches. As a result, while the spring is compressed and rubs the rectangular window, the window experiences less abrasion.

As the coil spring seated in the rectangular window gets larger, both the axially projecting amount of the rectangular window from the plate main body and the cut and lift angle of the rectangular window get larger.

In the conventional clutch disk assembly mentioned above, the rectangular windows of the retaining plates have round theft holes at the radially inside part on both sides of the rectangular window in a circular direction. Since the theft hole reduces stress, a crack in the retaining plate occurs less often.

However, these prior art plates with these round theft holes do not extend far enough to enable lifting of the rectangular window. Therefore, during the forming of the rectangular window, a crack is easily caused.

An object of the present invention is to make it more difficult to break the rectangular window in the plate used for the dampening disk assembly.

A plate is used for a dampening disk assembly, and supports a coil spring. The plate includes a disk like plate main body and a spring supporting part that is formed at the plate main body. The spring supporting part projects in an axial direction from the plate main body so as to be able to seat the coil spring. The spring supporting part includes an axially supporting part which continues in a radial direction and supports an axially outside part of the coil spring. It also includes a circular supporting part which is formed on both circular side parts of the axially supporting part and supports both ends of the coil spring. A hole which is long in one direction is formed around both corners of its inner circumferential side of the axially supporting part.

The lifted parts of the spring supporting parts have a large angle. Nonetheless, owing to the radially long hole, its amount to extend during forming the window is sufficiently secure, thereby reducing the possibility of cracking.

This long hole is formed to stretch over the axially supporting part, and the plate main body. The hole extends along the same direction as the circular supporting part extends, and has an oval shape. These features result in less cracks being caused during formation of the rectangular window.

The plate includes a disk-like plate main body and a spring supporting part, which is formed at the plate main body. The spring supporting part includes an axially supporting part which projects from the plate main body in an axial direction so as to be able to seat the coil spring, and continues in a radial direction and supports an axially outside part of the coil spring. The spring supporting part also includes a circular supporting part, which is formed on both circular side parts of the axially supporting part and supports both ends of the coil spring. A hole which extends from the radially inside part to the radially outside part is formed on both circular side parts of the axially supporting part.

A dampening disk assembly includes two plates, a hub and a coil spring, where the two plates are fixed to each other. The hub is disposed on a central side of the two plates. Both circular end parts of the coil spring are supported by the spring supporting parts and the coil spring couples the two plates and the hub elastically in a rotary direction.

These and other objects, features, aspects and advantages of the present invention will become apparent to those skilled in the art from the following detailed description, which, taken in conjunction with the drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
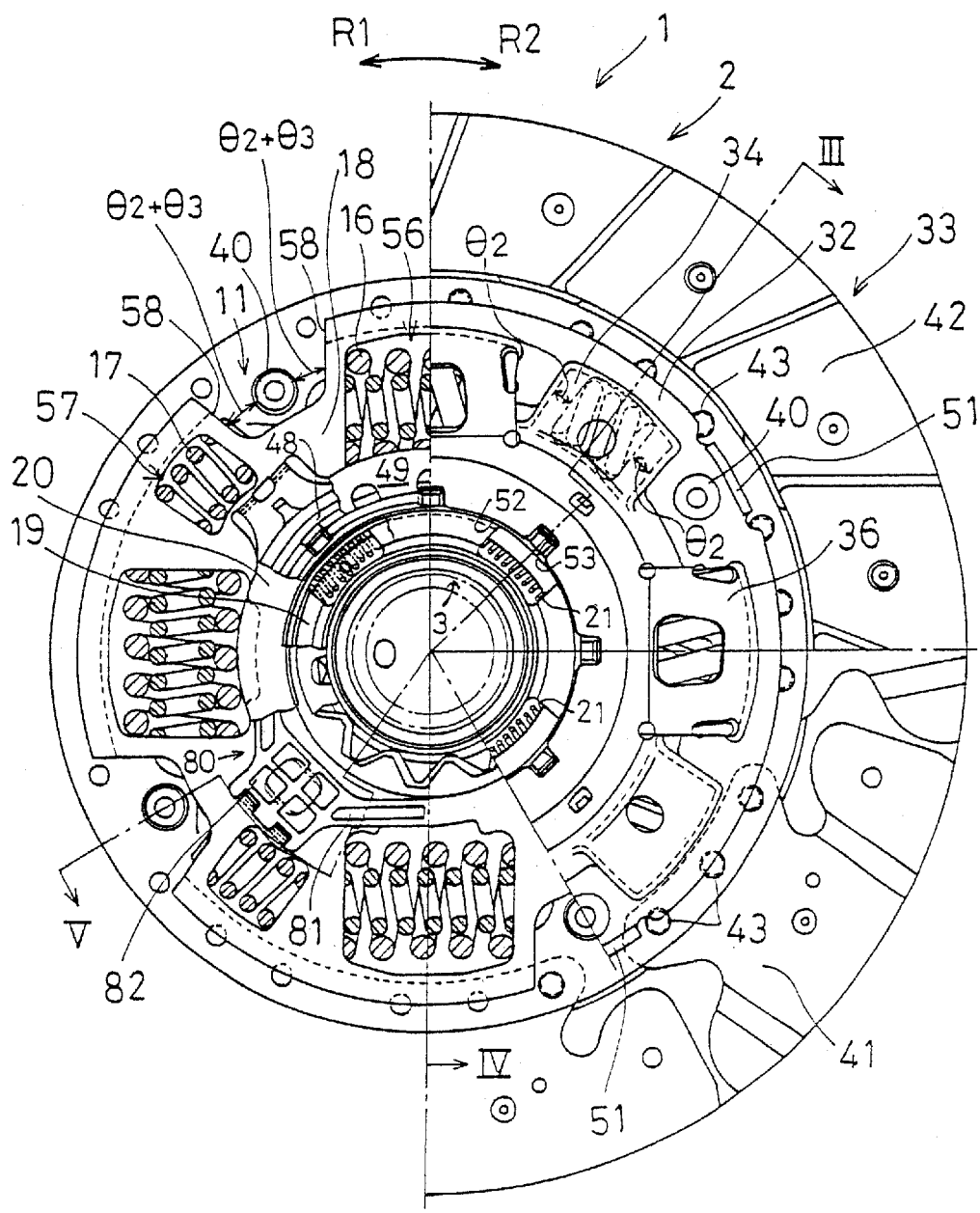
FIG. 1 is a partial side elevational view of a clutch disk assembly in accordance with an embodiment of the present invention with portions broken away for purposes illustration.
Figure 2:
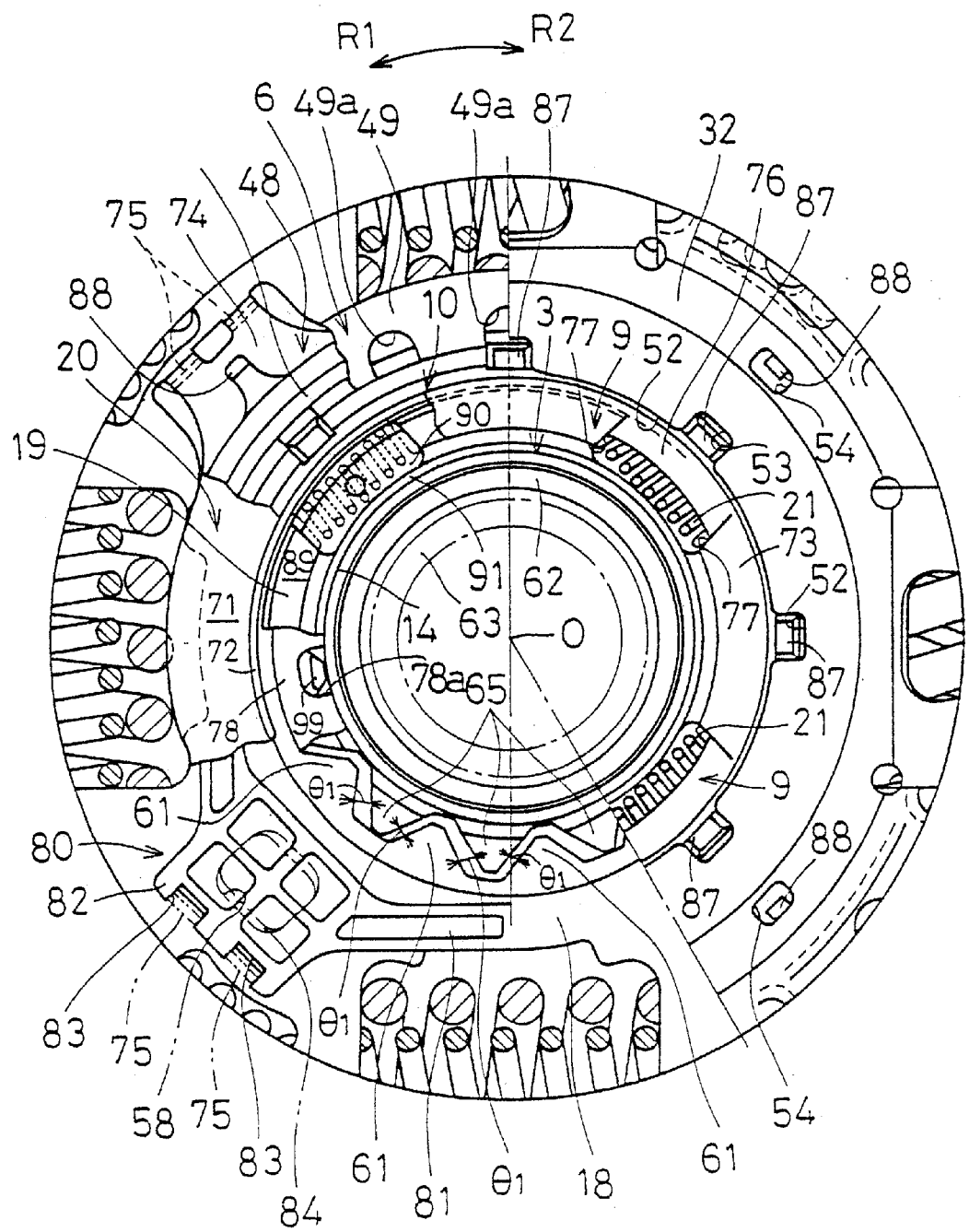
FIG. 2 is an enlarged partial side elevational view of a part of the clutch disk assembly illustrated in FIG. 1 with portions broken away for purposes of illustration.
Figure 3:
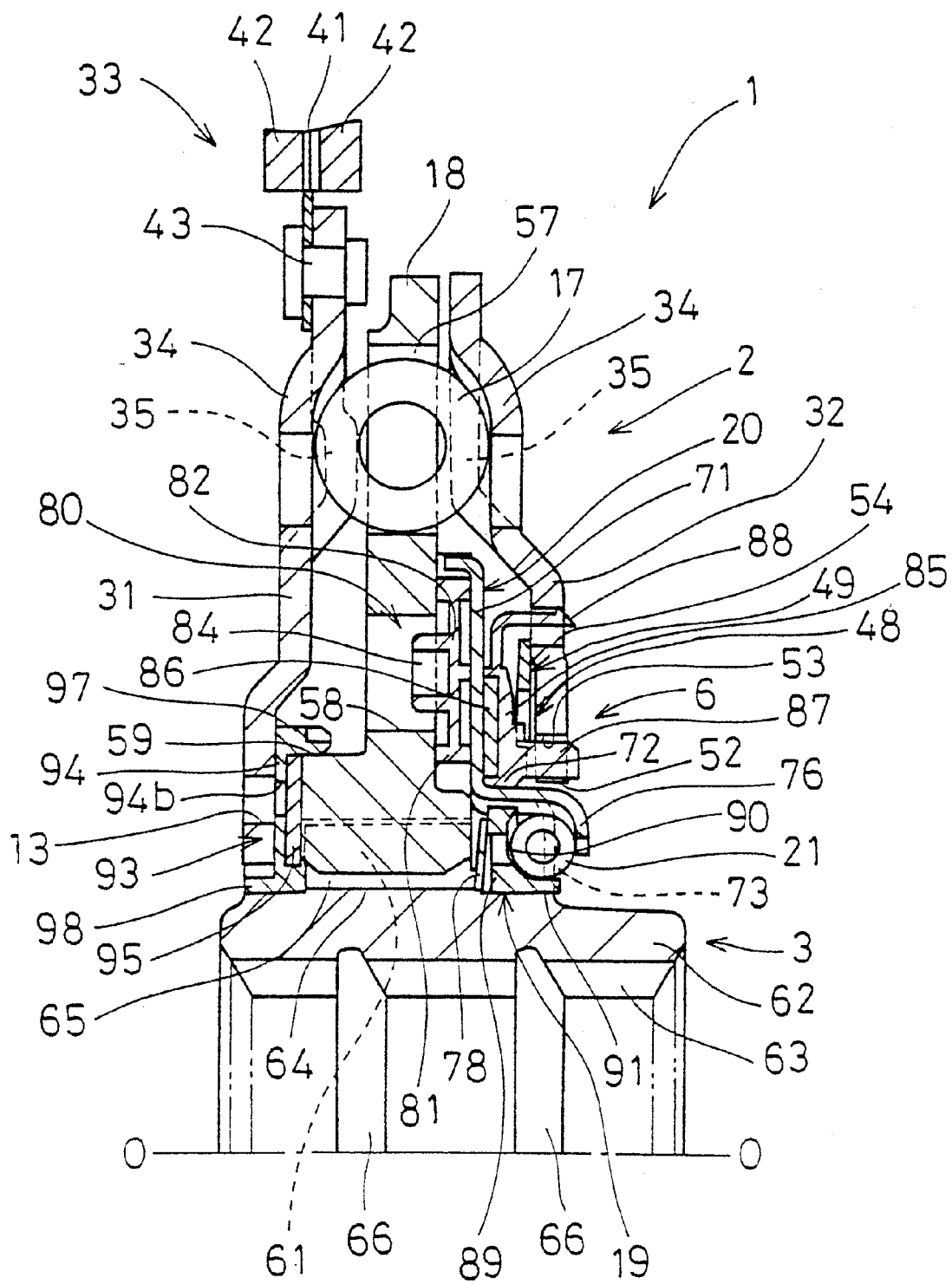
FIG. 3 is an enlarged partial cross sectional view of a part of the clutch disk assembly illustrated in FIG. 1 as viewed along section line O-III of FIG. 1.
Figure 4:
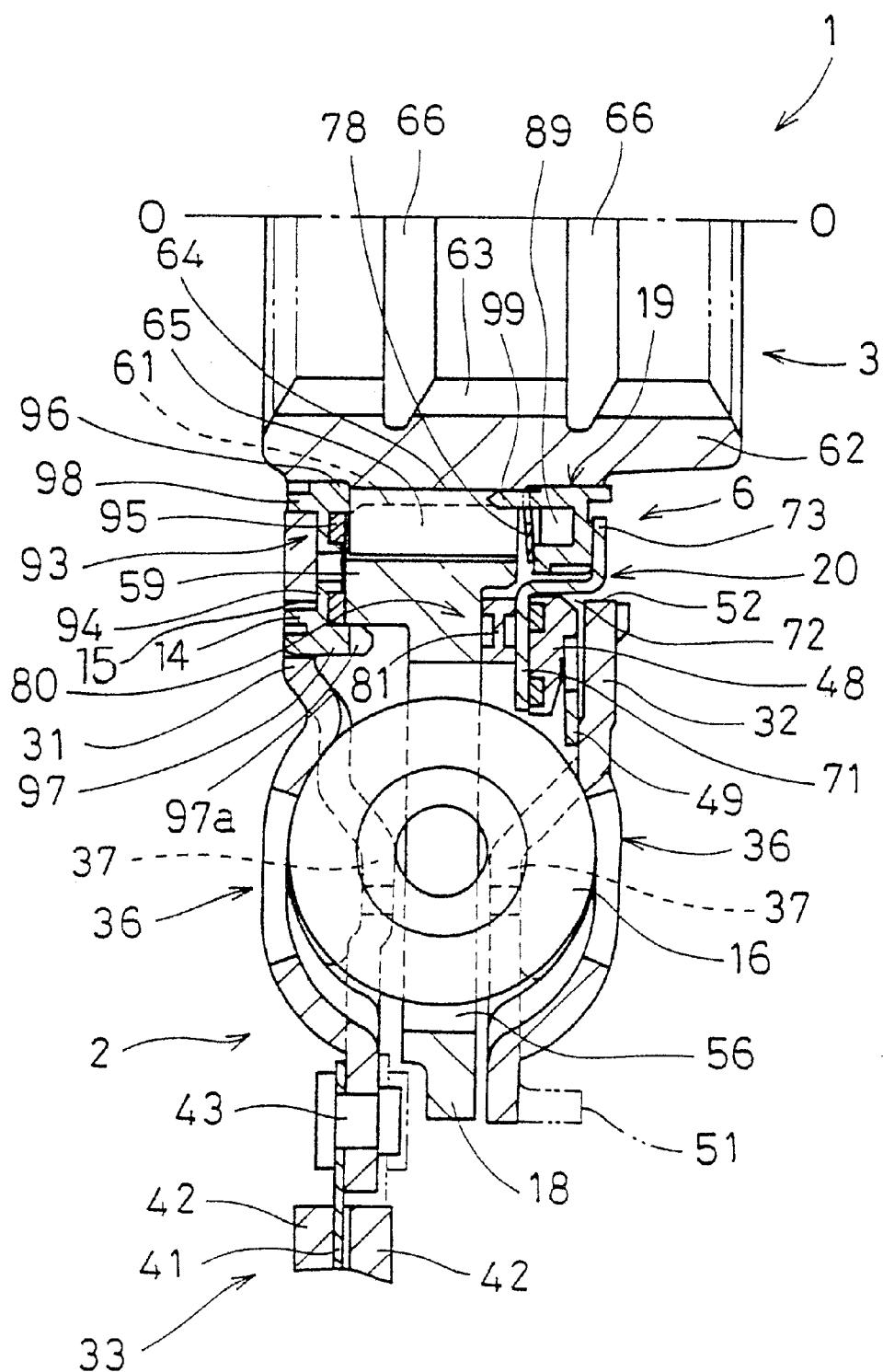
FIG. 4 is an enlarged partial cross sectional view of a part of the clutch disk assembly illustrated in FIG. 1 as viewed along section line O-IV of FIG. 1.
Figure 5:
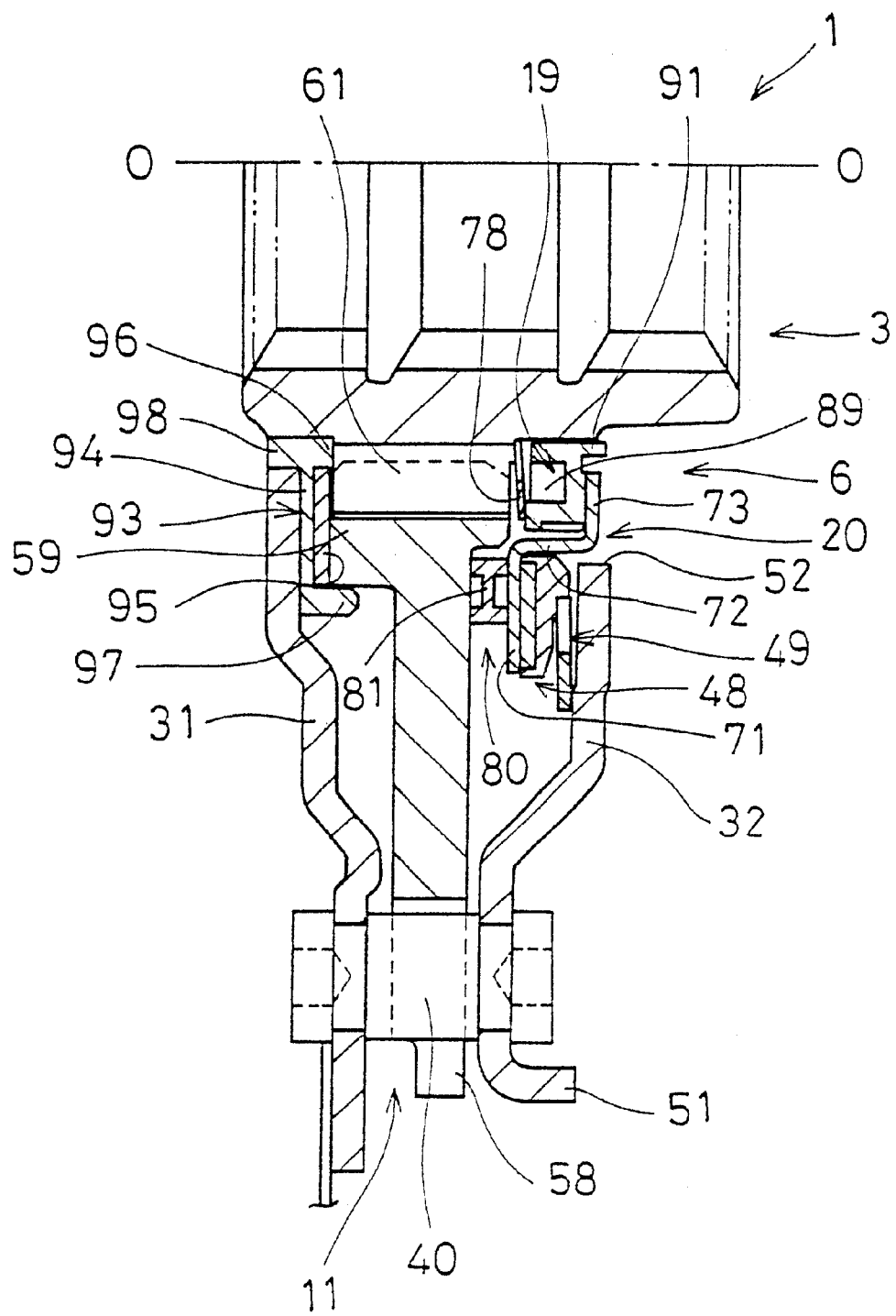
FIG. 5 is an enlarged partial cross sectional view of a part of the clutch disk assembly illustrated in FIG. 1 as viewed along section line O-V of FIG. 1.

Referring initially to FIGS. 1 to 5, a clutch disk assembly 1 is illustrated in accordance with a first embodiment of the present invention. The clutch disk assembly 1 is used for a clutch of a car or other motorized vehicle. On the left side of the clutch disk assembly as viewed in FIGS. 3 to 5, an engine and a flywheel (not shown in Figures) are located, and on the right side as viewed in FIGS. 3 to 5, a transmission (not shown in Figures) is located. Hereafter, the left side as viewed in FIGS. 3 to 5 is referred as a first axis side (engine side), and the right side as viewed in FIGS. 3 to 5 is referred as a second axis side (transmission side). The centerline O—O in each of the drawings represents an axis of rotation or a center of rotation of the clutch disk assembly 1. As shown in FIGS. 1 and 2, an arrow R1 indicates a first rotational direction (positive direction) of the flywheel and the clutch disk assembly 1, while an arrow R2 indicates its opposite rotational direction (negative direction).

Figure 6:
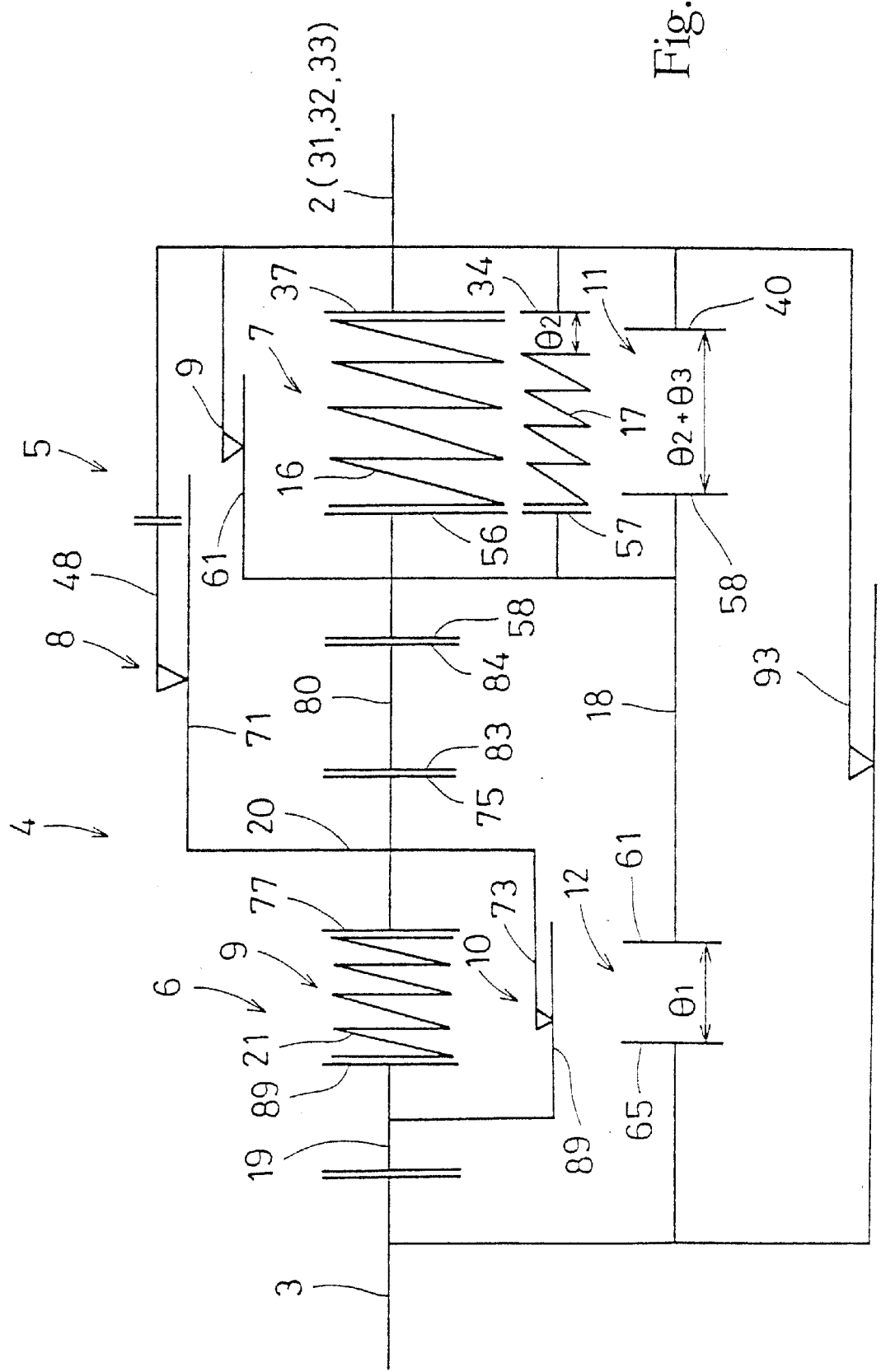
FIG. 6 is a diagrammatic machine circuit drawing of a dampening mechanism utilizing the clutch disk assembly in accordance with the present invention.

A clutch disk assembly 1, as shown in a machine circuit diagram of FIG. 6, mainly includes an input rotary portion 2, a hub or output rotary portion 3, and a dampening mechanism 4 disposed between the input rotary portion 2 and the hub 3. The dampening mechanism 4 includes a first dampening mechanism 5 with a characteristic of a torsion angle of a second step, and a second dampening mechanism 6 with a characteristic of a torsion angle of a first step. The dampening mechanism 4 also has a third dampening mechanism, discussed below, with a friction mechanism that operates throughout the range of the steps of torsion. The first dampening mechanism 5 and the second dampening mechanism 6 are disposed between the input rotary portion 2 and hub 3 so as to operate in series via a hub flange or intermediate plate 18. The third dampening mechanism is also disposed between the input rotary portion 2 and output hub 3.

Still referring to FIG. 6, the first dampening mechanism 5 basically includes a first elastic mechanism 7, a first friction mechanism 8 and a first stopper 11. The first elastic mechanism 7 has two sets of springs 16 and 17 as seen in FIG. 1. The first friction mechanism 8 generates friction when the hub flange 18 rotates relatively against the input rotary portion 2. The first stopper 11 is a mechanism that controls a relative turning angle between the hub flange 18 and the input rotary portion 2. The first stopper 11 allows the input rotary portion 2 and the hub flange 18 to rotate relatively to each other within a range of a torsion angle of $\theta_2+\theta_3$. The first elastic mechanism 7 (springs 16 and 17), the first friction mechanism 8 and the first stopper 11 are disposed between the hub flange 18 and the input rotary portion 2 so as to operate in parallel.

The second dampening mechanism 6 includes mainly a second elastic mechanism 9, a second friction mechanism 10 and a second stopper 12. The second elastic mechanism 9 is formed of a plurality of second springs 21. Each second spring 21 of the second elastic mechanism 9 has a spring constant, which is set to be smaller than each of the first springs 16 of the first elastic mechanism 7. The second friction mechanism 10 is set so as to generate a friction smaller than the friction generated by the first friction mechanism 8. The second stopper 12 is a mechanism to control a relative rotation between the hub 3 and the hub flange 18 and permits the hub 3 and the hub flange 18 to rotate relatively within a range of a torsion angle $\theta_1$. The second elastic mechanism 9, the second friction mechanism 10 and the second stopper 12 are disposed between the hub 3 and the hub flange 18 so as to operate in parallel.

The structure of the clutch disk assembly I will now be described in more detail with reference to FIG. 3 The input rotary portion 2 includes a first retaining plate (clutch plate) 31, a second retaining plate 32 and a clutch disk 33 coupled to the outer periphery of the first retaining plate 31. The first retaining plate 31 and the second retaining plate 32 are disk-shaped members which form annular plate portions that are disposed in an axial direction apart from each other by a predetermined distance. The first retaining plate 31 is disposed on the first axis side, and the second retaining plate 32 is disposed on the second axis side. The outer circumferential parts of the first retaining plate 31 and the second retaining plate 32 are fixedly coupled to each other by a plurality of stop pins 40 disposed in a circular direction side by side as seen in FIGS. 1 and 5. Consequently, the distance in an axial direction between the first retaining plate 31 and the second retaining plate 32 is determined by pins 40. Both plates 31 and 32 rotate together in a body. A cushioning plate 41 of the clutch disk 33 is fixedly coupled to the outer circumferential part of the first retaining plate 31 by a plurality of rivets 43 as seen in FIGS. 1, 3 and 4. An annular friction facing 42 is fixedly coupled to both sides of the cushioning plate 41.

As seen in FIG. 3, several first receptacles 34 are formed in each of the first retaining plate 31 and the second retaining plate 32 in equal intervals in a circular direction. The first receptacle 34 is a portion, which swells slightly in an axial direction. Each of the first receptacles 34 has a first supporting portion 35 on its both sides in a circular direction. The first supporting portions 35 oppose each other in a circular direction. As seen in FIG. 4, several second receptacles 36 are formed in each of the first retaining plate 31 and the second retaining plate 32 in equal intervals in a circular direction. The second receptacles 36 are disposed adjacent to the R1 side of each of the first receptacles 34. Each of the second receptacles 36 has a second supporting portion 37 on its both sides in a circular direction. Each second receptacle 36 is longer than the first receptacle 34 in both a radial and circular directions as seen in FIG. 1.

As seen in FIGS. 4 and 5, at an outer circumferential edge of the second retaining plate 32, a plurality of bent parts 51 that are bent toward the second axis side are formed. The bent parts 51 are formed adjacent to the stop pins 40. The bent parts 51 increase the strength of the circumference of the stop pin 40 over the stop pin 40 by itself Therefore, the stop pins 40 can be disposed at the most radially outer sides of the first retaining plate 31 and the second retaining plate 32, resulting in a high stopping torque. Since the bent parts 51 do not lengthen the second retaining plate 32 in a radial direction, the length of the second retaining plate 32 can be smaller in a radial direction compared with that of the conventional one with the same strength. When the length of the second retaining plate 32 in a radial direction is the same with that of the conventional one, the stop pins 40 can be disposed at the more radially outer side compared with the conventional one. Since the bent parts 51 are formed partially around the second retaining plate 32, the amount of metal plate material is reduced.

As seen in FIG. 3–5, the hub flange 18 is disposed in an axial direction between the first retaining plate 31 and the second retaining plate 32. The hub flange 18 operates as an intermediate portion between the input rotary portion 2 and the hub 3. The hub flange 18 is a disk-shaped member or annular portion that is thicker than the plates 31 and 32. At the hub flange 18, several first window holes 57 are formed corresponding to the first receptacles 34. The first window holes 57 are formed for the first receptacles 34. The circular angle of each of the first window holes 57 is smaller than the circular angles between the first supporting portions 35 of the first receptacles 34. The centers of a rotary direction of the first window holes 57 coincide approximately with that of the first receptacles 34. Therefore, as seen in FIG. 1, a gap of a torsion angle $\theta_2$ is formed at both sides in a circular direction between the circular ends of the first window holes 57 and the first supporting portions 35 of the first receptacles 34. The springs 17 are installed within the first window holes 57. The springs 17 are coil springs with their circular ends touching the circular ends of the first window holes 57. In this condition, gaps with torsion angles $\theta_2$ exist between both circular ends of the springs 17 and the first supporting parts 35 of the first receptacles 34 as seen in FIG. 1.

As seen in FIG. 4, at the hub flange 18, the second window holes 56 are formed at the locations corresponding to the second receptacles 36. The lengths of the second window holes 56 in radial and circular directions coincide approximately with those of the second receptacles 36. The first springs 16 are disposed within the second window holes 56. The first springs 16 form an elastic portion that includes two kinds of coil springs. The circular ends of first springs 16 touch both circular ends of the second window holes 56. In addition, both the circular ends of the first springs 16 touch the second supporting portions 37 of the second receptacle 36.

As seen in FIGS. 3 and 4, a cylinder-shaped portion 59, which extends in axially both directions, is formed at the inner circumferential part of the hub flange 18. The cylinder-shaped portion 59 has a plurality of internal teeth 61 formed thereon as seen in FIG. 2. These internal teeth 61 extend radially inward from the cylinder-shaped portion 59.

The hub 3 is a cylinder-shaped portion, which is disposed at the inner circumferential side of the plates 31 and 32 as well as at the inner circumferential side of the hub flange 18. In other words, the hub 3 is located within a center hole of each of these portions. The hub 3 includes mainly a cylinder-shaped boss 62. The hub 3 has a plurality of splines 63 formed at a center hole of the boss 62. Since the splines 63 are connected with the splines of a shaft extending from the transmission, it is possible to output a torque from the hub 3 to the transmission shaft. A flange 64 extends radially outwardly from the boss 62 of hub 3. In this embodiment, the width of the flange 64 as measured in a radial direction is small. The flange 64 of hub 3 has a plurality of external teeth 65 extending radially outward therefrom. The external teeth 65 can be thought to form a part of the flange 64 that extends radially outwardly from the boss 62. The external teeth 65 have a radial length corresponding to the cylinder-shaped portion 59 of the hub flange 18. The external teeth 65 extend within a space between the internal teeth 61, and gaps with predetermined torsion angles $\theta_1$ are formed in a circular direction at both sides of the external teeth 65. The torsion angle $\theta_1$ on the R2 side of the external teeth 65 is set to be slightly larger than the torsion angle $\theta_1$ on the R1 side. The circular width of either the internal tooth 61 or the external tooth 65 is getting smaller, as it is located closer to the end of the tooth in a radial direction.

Since both the internal teeth 61 and the external teeth 65 are formed along the entire periphery, the areas which both the internal teeth 61 and the external teeth 65 touch each other increase. In other words, being different from the conventional teeth, a cutout in which an elastic portion with a low rigidity is disposed is not formed. As a result, the contact areas between the internal teeth 61 and the external teeth 65 increase. In other words, since a bearing stress between both of these portions decreases, an abrasion or damage of the portions is unlikely to occur. Consequently, the present teeth system has a characteristic of a high torque using a smaller space compared with that in which a part of the teeth are deleted.

The second dampening mechanism 6 will now be described as follows with particular reference being made to FIGS. 3–5 and 8–11. The second dampening mechanism 6 not only transmits a torque between the hub 3 and the hub flange 18, but also absorbs and dampens torsion vibrations. The second elastic mechanism 9 of the second dampening mechanism 6 mainly includes the second springs 21. The second friction mechanism 10 of the second dampening mechanism 6 includes a bushing 19, a fixing plate 20 and a second cone spring 78. The second dampening mechanism 6 is located to be different in an axial direction from the internal teeth 61 and the external teeth 65, which connect the hub 3 and the hub flange 18. In particular, as seen in FIGS. 3–5, the second dampening mechanism 6 is placed so as to be shifted from the internal teeth 61 and the external teeth 65 to the transmission side. In this way, the sufficient contact areas between the internal teeth 61 and the external teeth 65 can be secured. In addition, since the second dampening mechanism 6 is not disposed between the internal teeth 61 and the external teeth 65, the sufficient margin to connect the second springs 21 can be secured, being different from the conventional one. As a result, since a spring sheet is not necessary, the performance to assemble the second springs 21 is improved.

The fixing plate 20 operates as an input portion of the input side in the second dampening mechanism 6. In other words, the fixing plate 20 is a portion to which a torque is inputted from the hub flange 18. The fixing plate 20 is a thin metal plate portion disposed between the inner circumference of the hub flange 18 and the inner circumference of the second retaining plate 32. As shown in FIG. 8 to 11, the fixing plate 20 includes a first disk-shaped portion 71, a cylinder-shaped or tubular portion 72 and the second disk-shaped portion 73. The cylinder-shaped portion 72 extends from the inner circumferential edge of the first disk-shaped portion 71 toward the second axis side (the transmission side). The second disk-shaped portion 73 extends from the cylinder-shaped portion 72 inward in a radial direction.

As seen in FIGS. 2–5, a spacer 80 is disposed between the first disk-shaped portion 71 of the fixing plate 20 and the hub flange 18. The spacer 80 connects the fixing plate 20 with the hub flange 18 in a rotary direction, and plays a role to receive a force which is applied from the fixing plate 20 to the hub flange 18. The spacer 80 is an annular resin portion, and has many lightening portions to decrease the weight. The spacer 80 includes an annular portion and a plurality of protrusions 82 projecting from the annular portion 81 outward in a radial direction as seen in FIG. 2. Two cutouts 83 are formed at the outer circumferential edge of each of the protrusions 82. A projection 84 extends from each of the protrusions 82 toward the first axis side as seen in FIG. 3. Projections 84 are inserted in connecting holes 58, which are formed in the hub flange 18. The projections 84 are connected with the connecting holes 58 such that they are slightly movably in a radial direction and relatively unmovably in a rotary direction.

Figure 8:
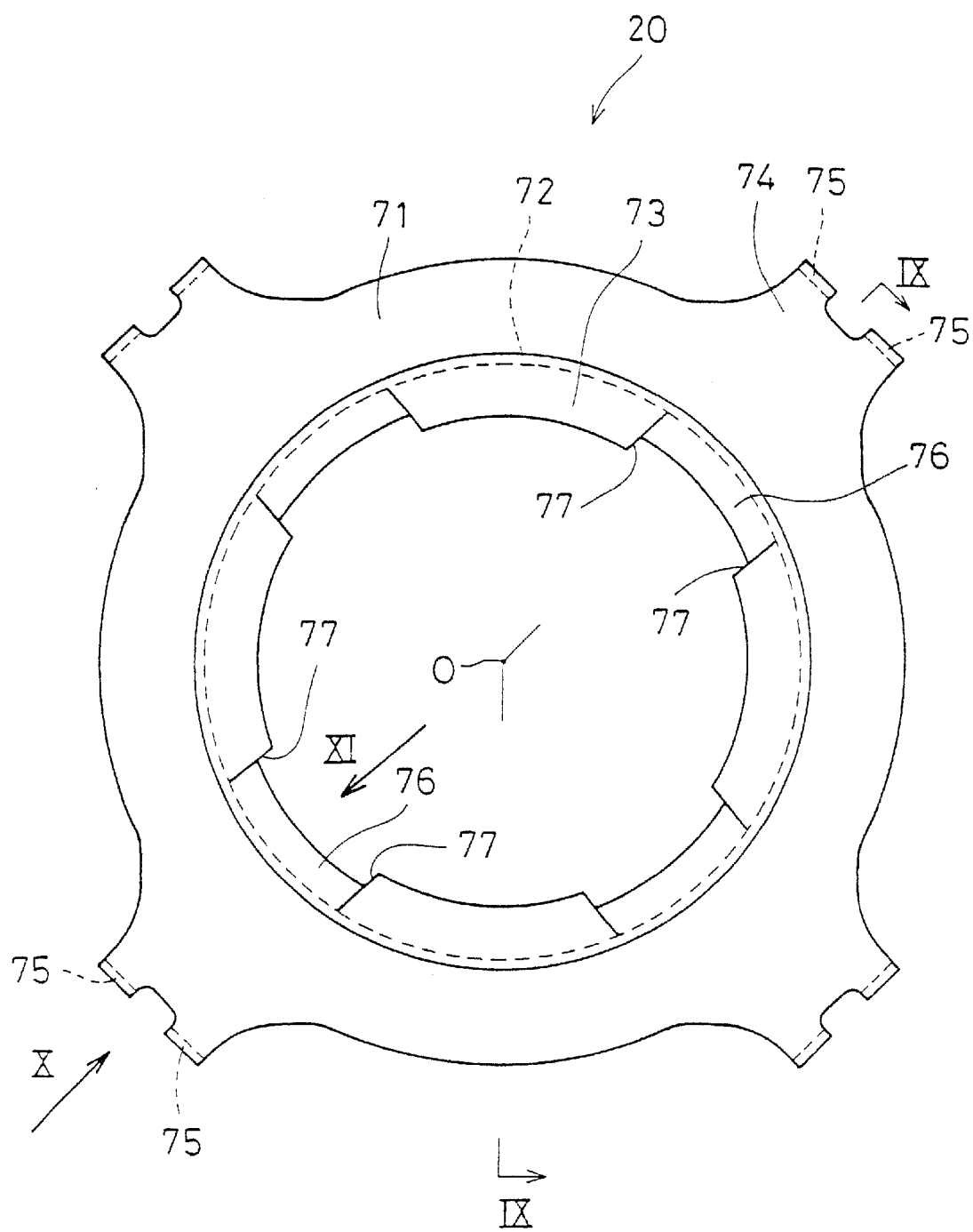
FIG. 8 is a side elevational view of a fixing plate utilized with the clutch disk assembly illustrated in FIG. 1 in accordance with the present invention.
Figure 9:
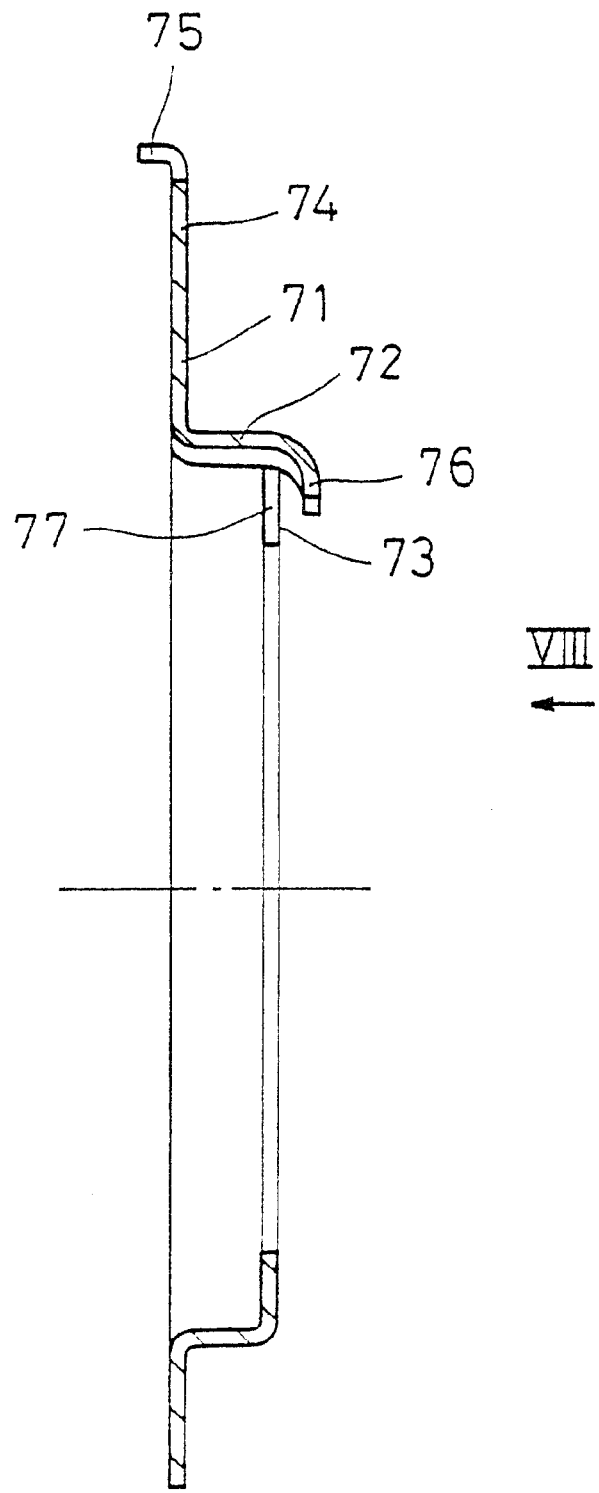
FIG. 9 is a cross sectional view the fixing plate illustrated in FIG. 8 as viewed along section line IX—IX of FIG. 8.
Figure 10:
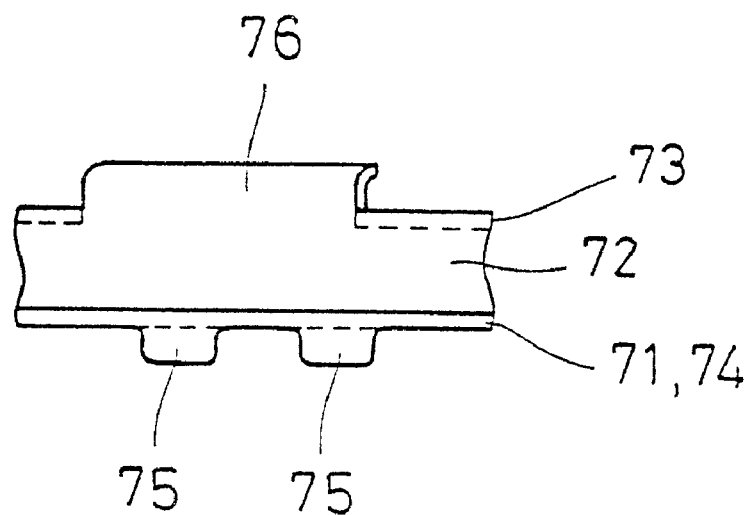
FIG. 10 is a partial edge elevational view of a part of the fixing plate illustrated in FIG. 8 as viewed along an arrow X of FIG. 8.
Figure 11:
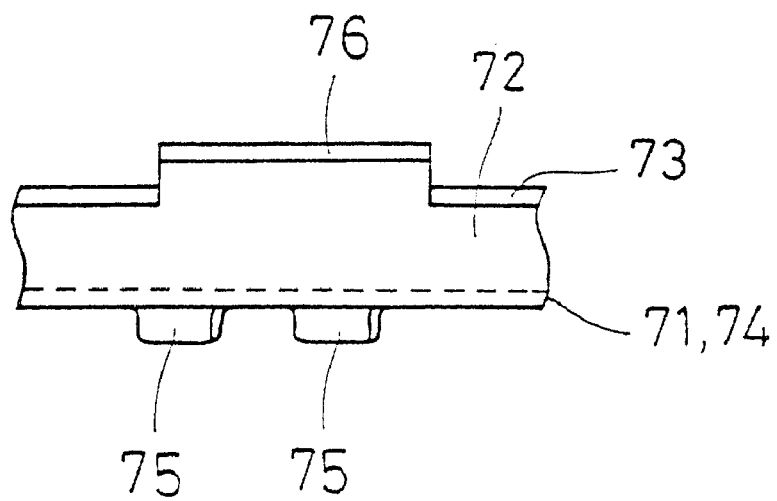
FIG. 11 is a partial edge elevational view of a part of the fixing plate illustrated FIG. 8 as viewed along an arrow XI of FIG. 8.
Figure 12:
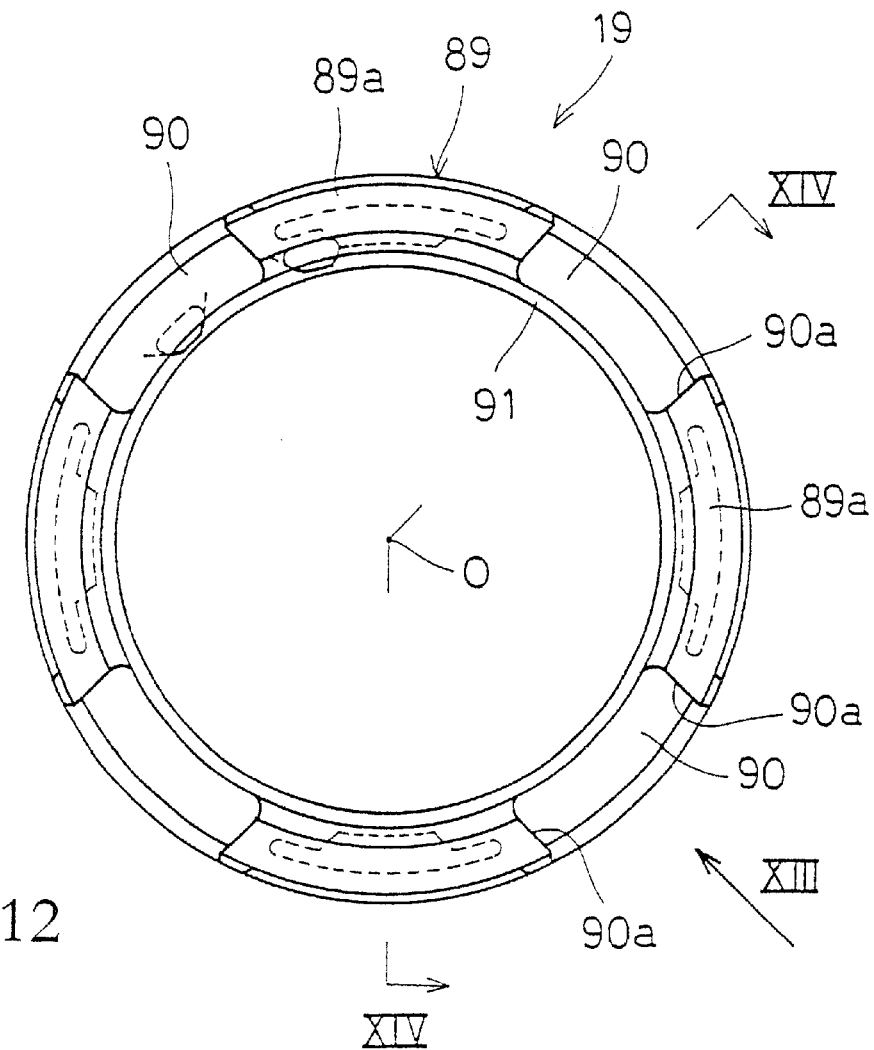
FIG. 12 is a front side elevational view of a bushing utilized with the clutch disk assembly illustrated in FIG. 1 in accordance with the present invention.
Figure 13:
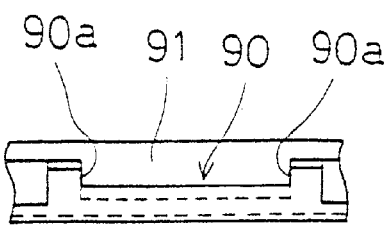
FIG. 13 is a partial edge elevational view of a part of the bushing illustrated in FIG. 12 as viewed along an arrow XIII of FIG. 12.

As seen in FIGS. 2 and 8, fixing plate 20 has four protrusions 74. Protrusions 74 project outwardly in a radial direction at equal intervals in a circular direction from the first disk-shaped portion 71 of the fixing plate 20. Each of the protrusions 74 are formed corresponding to the protrusions 82 of the spacer 80. Nails or tabs 75 of protrusions 74 are located within the cutouts 83 which are formed at the ends of the protrusions 82 of the spacer 80. In the structure mentioned above, the fixing plate 20 is fixedly connected with the hub flange 18 via the spacer 80 to be relatively unrotatably relative to each other. In other words, the fixing plate 20 is connected to hub flange 18 so that a torque can be transmitted from the hub flange 18 to fixing plate 20. In addition, the hub flange 18 via the spacer 80 supports the first axis side of the fixing plate 20. The fixing plate 20 is movable toward the second axis side away from the spacer 80 and the hub flange 18.

Referring to FIGS. 1–5, the first friction mechanism 8 that is formed between the fixing plate 20 and the second retaining plate 32 will now be described in more detail. The first friction mechanism 8 includes a first friction washer 48 and a first cone spring 49. The first friction washer 48 is connected with the second retaining plate 32 so as to be relatively non-rotatable, but axially movably relative to each other, and generates a friction by rubbing the fixing plate 20. The first friction washer 48 includes mainly an annular resin portion. The first friction washer 48 includes an annular portion 85 made of a resin and a friction portion 86.

The resin used to form the annular portion 85 generally includes a rubber type resin and a nylon type resin. For example, the resin, which is used for the annular portion 85, can be PPS (polyphenylensulfide) or PA 46 either of which is a polyamide type nylon resin. When the annular portion 85 is not molded, PPS is preferred, and when the annular portion 85 is molded, PA 46 is preferred. The description mentioned above can be applied to other annular resin portion mentioned herein.

A friction portion 86 is molded to or bonded to the fixing plate 20 side of the annular portion 85. The friction portion 86 is a portion that is designed to increase a friction coefficient between the first friction washer 48 and the fixing plate 20, and extends in an annular or disk-like shape. The annular portion 85 has a plurality of rotationally connecting portions 87 extending toward the second axis side. These connecting portions 87 are formed at the inner circumference of the annular portion 85. The rotationally connecting portions 87 are inserted in a plurality of cutouts 53 which are formed in a center hole 52 (inner circumferential edge) of the second retaining plate 32. In this way, the first friction washer 48 is connected with the second retaining plate 32 relatively non-rotatable manner, but in an axially movable manner. In addition, in the annular portion 85, connecting portions 88, which extend outward in a radial direction from the outer circumferential edge and then extend toward the second axis side. The connecting portions 88 are relatively thin and have a tab or detent portion at the end. The connecting portions 88 are inserted in holes 54, which are formed at the second retaining plate 32, and its tab or detent portions of connecting portions 88 are connected with the second retaining plate 32. The connecting portions 88 urge itself outward in a radial direction when it is connected, and press itself against the holes 54. Therefore, after partially assembling (subassembling), the first friction washer 48 is difficult to remove from the second retaining plate 32. In this way, at the first friction washer 48, the rotationally connecting portions 87 transmit a torque and the connecting portions 88 connect temporarily a portion of first friction washer 85 with the second retaining plate 32. The connecting portions 88 are thin and able to bend. Since the connecting portions 88 have a low rigidity, it will not typically break during sub-assembling. Therefore, since a force is not applied to the rotationally connecting portions 87 during subassembling, the first friction washer 48 is less likely to be broken than the conventional resin friction washer which have a tab or detent portion of radially connecting portions 88 to connect a second retaining plate 32. In addition, since a press fitting machine is not necessary during sub-assembling, an equipment cost can be reduced.

The first cone spring 49 is disposed between the first friction washer 48 and the inner circumference of the second retaining plate 32. The first cone spring 49 is compressed in an axial direction between the second retaining plate 32 and the first friction washer 48. The outer circumferential edge of the first cone spring 49 is supported by the second retaining plate 32, while the inner circumferential edge of the first cone spring 49 contacts the annular portion 85 of the first friction washer 48. As seen in FIG. 2, the first cone spring 49 has a plurality of cutouts 49a formed on its inner circumferential side. It can be thought that the cutouts 49a at the inner circumferential edge form a plurality of projections on the inner circumferential edge of first cone spring 49. Projection parts tat are formed on the outer circumferential side of the rotationally connecting portions 87 of the first friction washer 48 are inserted in the cutouts 49a. In this way, the first cone spring 49 is connected with the first friction washer 48 relatively non-rotatable manner.

Referring to FIGS. 8–11, at the second disk-shaped portion 73 of the fixing plate 20, several cut and lift parts 76 are formed at equal intervals in a circular direction. The cut and lift parts 76 are formed by cutting and lifting from the inner circumferential side of the second disk-shaped portion 73. The cut and lift parts 76 are disposed closer to the second axis side compared with other parts of the second disk-shaped portion 73. At a part of the second disk-shaped portion 73 where the cut and lift parts 76 are formed, a cutout part is formed as seen in FIG. 8. A supporting part 77 is formed at both ends of the cutout part in a circular direction.

Figure 14:
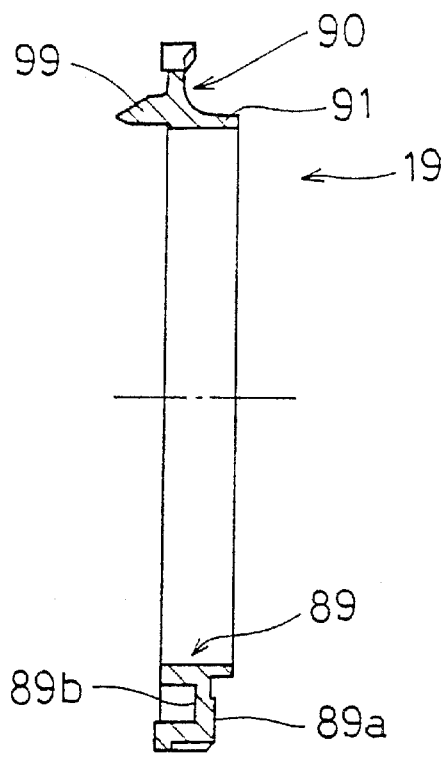
FIG. 14 is a cross sectional view of the bushing illustrated in FIG. 12 as viewed along section line XIV—XIV in FIG. 12.
Figure 15:
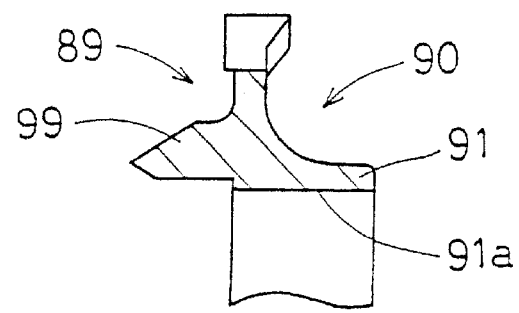
FIG. 15 is an enlarged, partial cross sectional view of a part the bushing illustrated in FIGS. 12–14.

A bushing 19 operates as an output portion in the second dampening mechanism 6. The bushing 19 is connected with the hub 3 in a relatively non-rotatable manner. In particular, the bushing 19 is an annular resin portion, which is disposed on the second axis side of both the internal teeth 61 of the hub flange 18 and the external teeth 65 of the hub 3. The bushing 19 is also located on the inner circumferential side of the cylinder-shaped portion 72 of the fixing plate 20, and in a space on the outer circumferential side of the second axis side part of the boss 62. The bushing 19 includes mainly an annular portion 89 with a plurality of spring receptacles 90, as shown in FIG. 12 to 19. The spring receptacles 90 are formed at equal intervals in a circular direction at the side face of the second axis side of the annular portion 89. The spring receptacles 90 are formed at locations corresponding to the cut and lift parts 76 or the cutout parts of the fixing plate 20. The spring receptacles 90 are concave parts that are formed at the side face of the bushing 19 on the second axis side. The concave parts, as shown in FIG. 14 and 15, are formed smoothly so that its cross section forms a part of a circle. In addition, a hole is formed that penetrates in an axial direction each spring receptacle 90 at its center in both radial and circular directions. At the inner circumference of the annular portion 89, an inner circumferential supporting part 91 is formed with a cylinder like shape. The supporting part 91 extends toward the second axis side from the annular portion 89. An inner circumferential face 91a of the bushing 19 is formed by the inner circumferential supporting part 91. This inner face 91a touches or is close to the outer circumferential face of the boss 62. A side face 89a is formed on the second axis side of the annular portion 89 of the bushing 19. This side face 89a touches the side face of the first axis side of the second disk-shaped portion 73 of the fixing plate 20.

The second friction mechanism 10 is formed between the annular portion 89 of the bushing 19 and the second disk-shaped portion 73 of the fixing plate 20. The second springs 21 are disposed within each of the spring receptacles 90. The second springs 21 are preferably coil springs that are smaller than the first spring 16 or the spring 17. The second spring 21 also has spring constants that are smaller than the first spring 16 or the spring 17. The second springs 21 are disposed within the spring receptacles 90 with the ends of the second springs 21 in a circular direction touching or close to both ends of the spring receptacles 90 in a circular direction. Both the axially inside part (the first axis side) and the inner circumferential side of the second springs 21 are supported by the bushing 19 within the spring receptacles 90.

The supporting parts 77 of the fixing plate 20 are connected in a rotary direction with both the circular ends of the second springs 21. In this way, a torque is transmitted from the fixing plate 20 to the bushing 19 via the second springs 21. The first axis side of the end face of the second springs 21 in a circular direction is totally supported by the circular end of the spring receptacles 90. In addition, the circular end faces of the second springs 21 are supported by supporting parts 77. Thus, the second spring 21 has a large connecting margin at both circular ends. In other words, at both circular ends of the second springs 21 the area of a part, which is supported increases. This arrangement is made possible by disposing the second springs 21 at a location, which is shifted in an axial direction from the conventional location between a hub 3 and a hub flange 18. Consequently, a spring sheet can be removed, resulting in the reduced number of parts.

The cut and lift parts 76 are disposed so as to support the axial outsides (the second axis sides) of the second springs 21. Thus, the outer circumferential side and the axial outsides of the second springs 21 are supported by the fixing plate 20.

Figure 16:
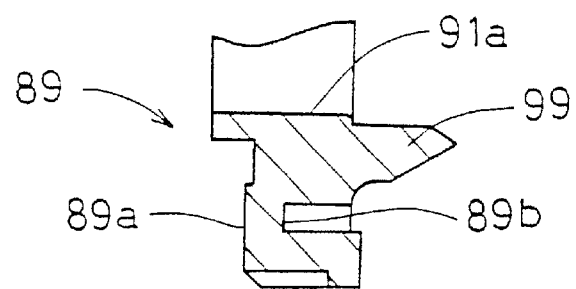
FIG. 16 is an enlarged, partial cross sectional view of a part the bushing illustrated in FIGS. 12–15 as viewed along section line XVI—XVI of FIG. 17.
Figure 17:
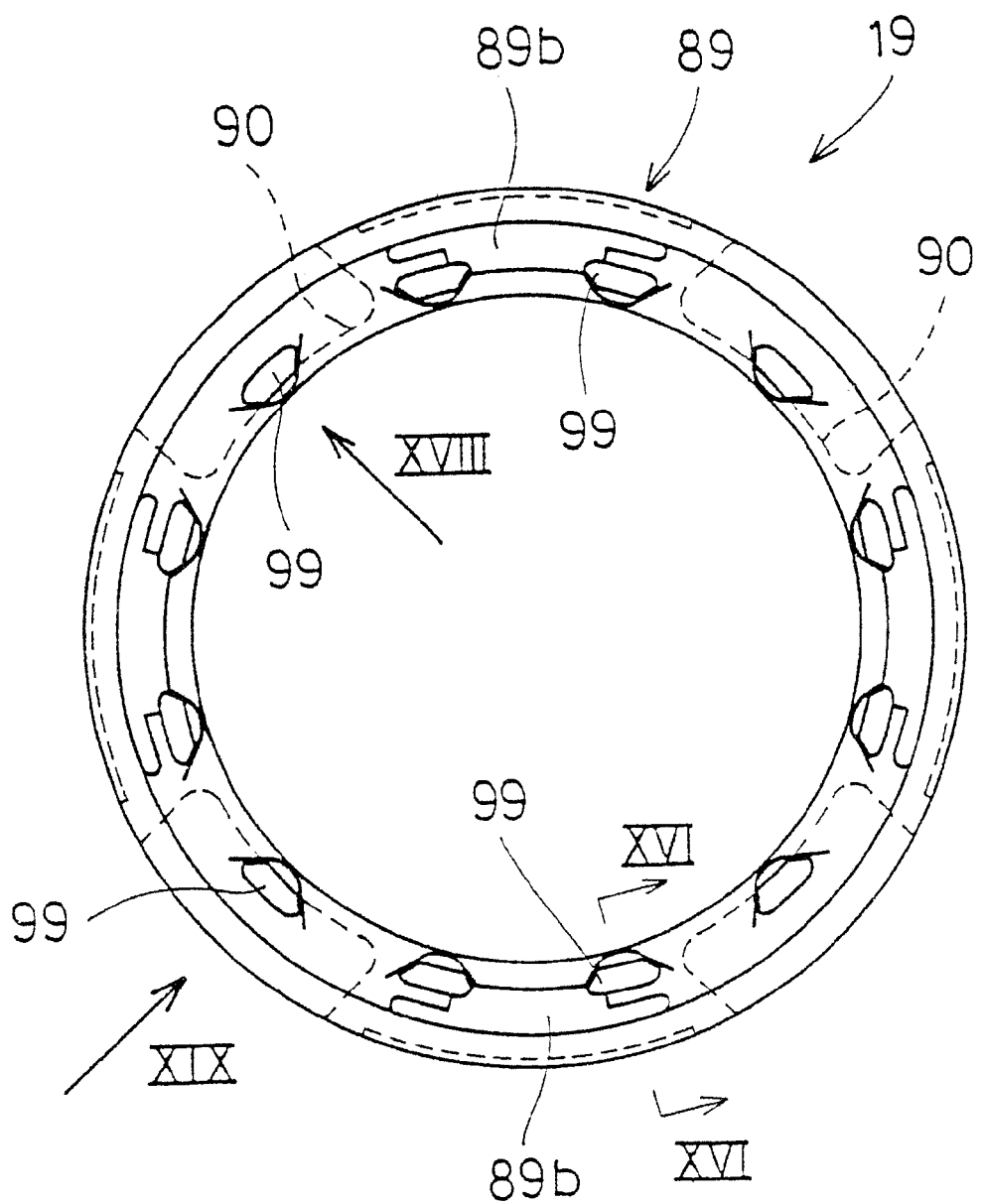
FIG. 17 is a back side elevational view of the bushing illustrated in FIGS. 12–16 for use with the clutch disk assembly illustrated in FIG. 1 in accordance with the present invention.
Figure 18:
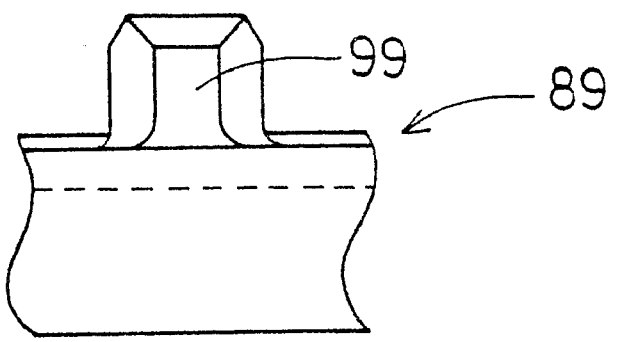
FIG. 18 is an enlarged, partial cross sectional view of a part the bushing illustrated in FIGS. 12–17 as viewed along an arrow XVIII of FIG. 17.
Figure 19:
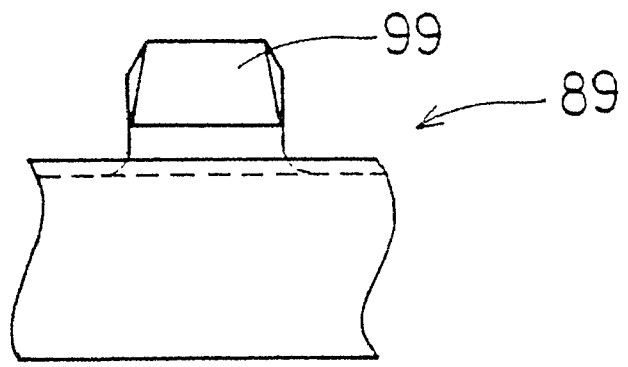
FIG. 19 is an enlarged, partial cross sectional view of a part the bushing illustrated in FIGS. 12–18 as viewed along an arrow XIX in FIG. 17.

As seen in FIGS. 4, 16 and 17, several connecting parts 99 are formed at the bushing 19 that extend from the annular portion 89 toward the first axis side. The connecting parts 99 are projections that extend toward the first axis side for transmitting a torque from the bushing 19 to the hub 3. The connecting parts 99 have cross sections that fit into gaps between the external teeth 65. The connecting parts 99 are inserted between the external teeth 65 of the hub 3. Thus, the connecting parts 99 are connected with the external teeth 65 in an unmovable manner in a circular direction.

A second cone spring 78 is an urging portion in the second friction mechanism to urge the second disk-shaped portion 73 and the annular portion 89 towards each other in an axial direction. The second cone spring 78 is disposed in an axial direction between the bushing 19 and the external teeth 65 of the hub 3 and the internal teeth 61 of the flange 18. The inner circumference of the second cone spring 78 is supported by the flange 64 of the hub 3, while the outer circumference of the second cone spring 78 touches the annular portion 89 of the bushing 19. The second cone spring 78 is compressed in an axial direction, and urges the bushing 19 toward the second axis side. As a result, the side face 89a of the second axis side of the annular portion 89 of the bushing 19 and the side face of the first axis side of the second disk-shaped portion 73 of the fixing plate 20 are urged towards each other in an axial direction by a predetermined force. The second cone spring 78 has an inner and outer diameters smaller than those of the first cone spring 49. The second cone spring 78 also has a thickness that is much smaller than that of the first cone spring 49. Thus, an urging force of the second cone spring 78 is much smaller than that of the first cone spring 49. At an inner circumferential edge the second cone spring 78 has a plurality of cutouts formed at an inner circumferential edge of the second cone spring 78. It can be thought that the cutouts of the cone spring 78 form a plurality of projections at the inner circumferential edge. The connecting parts 99 mentioned above extend within the cutouts of the cone spring 78.

As described above, the fixing plate 20 operates in the second dampening mechanism 6 as an input portion to connect with the second springs 21, as a portion included in the second friction mechanism 10, and as a portion included in the first friction mechanism 8. An advantage for the use of the fixing plate 20 is described as follows. The fixing plate 20, as described above, operates in the second dampening mechanism 6 as an supporting portion to support both ends of the second springs 21 in a circular direction and as an portion included in the second friction mechanism 11. Thus, one portion has two functions, resulting in a small number of parts. In addition, the fixing plate 20 supports the outside in an axial direction of the second spring 21. Furthermore, the fixing plate 20 includes friction faces both for the second friction mechanism 10 to generate a friction by rubbing at the first step of the torsion characteristic and for the first friction mechanism 8 to generate a friction by rubbing at the second step of the torsion characteristic. Thus, one portion has two friction faces, resulting in an easy adjustment and control of the friction characteristic of both friction faces. In other words, rubbing faces for both a flange of a boss and a hub flange are not necessary to be controlled, being different from that of the conventional dampening mechanism. Particularly, since the fixing plate 20 has a small size and a simple structure, being different from the conventional hub or hub flange, it is easy to control its friction face. Since the fixing plate 20 mentioned above is made of a metal plate, the fixing plate 20 with a desired shape can be obtained easily by press working, resulting in a low cost of the fixing plate 20.

An advantage of the bushing 19 is described as follows. Since the bushing 19 is made of a resin, its desired shape can be obtained easily. Particularly, since it is made of a resin and the connecting parts 99 can be formed in a body, its production is easy. The connecting parts 99 are connected with the external teeth 65 of the hub 3 therebetween in a circular direction. Therefore, it is not necessary to form a particular hole or concave to connect with the hub 3. Consequently, the working process for the hub 3 does not increase. The bushing 19 operates as an output portion of the second dampening mechanism 6. The bushing 19 connects with both circular ends of the second springs 21, and includes a part of the second friction mechanism 10. Thus, a single portion performs a torque transmission and friction generation, resulting in the small number of total parts.

The second cone spring 78 which urges friction faces each other in an axial direction in the second friction mechanism 10 is supported by the flange 64 of the hub 3. Thus, the second cone spring 78 is not supported by a retaining plate, being different from the conventional one, but supported by a different portion. Therefore, a hysteresis torque at the first step of characteristic is stable. Therefore, it is easy to control the hysteresis torque of the first step. A second retaining plate 32 supports both the conventional first and second urging portions. Therefore, an urging force of the first elastic portion may deform a retaining plate, resulting in a change of a posture of the second urging portion and a problem of an unstable urging force of the second urging portion. In this embodiment, an urging force of the first cone spring 49 and that of the second cone spring 78 are applied to the fixing plate 20 each other in an axially opposite direction. In other words, the first cone spring 49 urges the fixing plate 20 via the first friction washer 48 toward the first axis side, on the contrary the second cone spring 78 urges the fixing plate 20 via the bushing 19 toward the second axis side.

The structure of the second stopper 12 is not to apply a torque to each portion of the second dampening mechanism 6, when a torque is large. A torque is not applied to the bushing 19, the second coil springs 21 and the fixing plate 20 within a range of the second step of the torsion characteristic. Consequently, each portion does not need a very large strength and its design is easy.

Referring to FIGS. 3–5 and 20–22, a bushing 93, which forms a part of a third dampening mechanism, will now be described in more detail. The bushing 93 is disposed at the inner circumference of the first retaining plate 31 and touches the outer circumferential face of the hub 3, the end face of the flange 64, the external teeth 65, the cylinder-shaped portion 59 of the hub flange 18 and the internal teeth 61.

Figure 20:
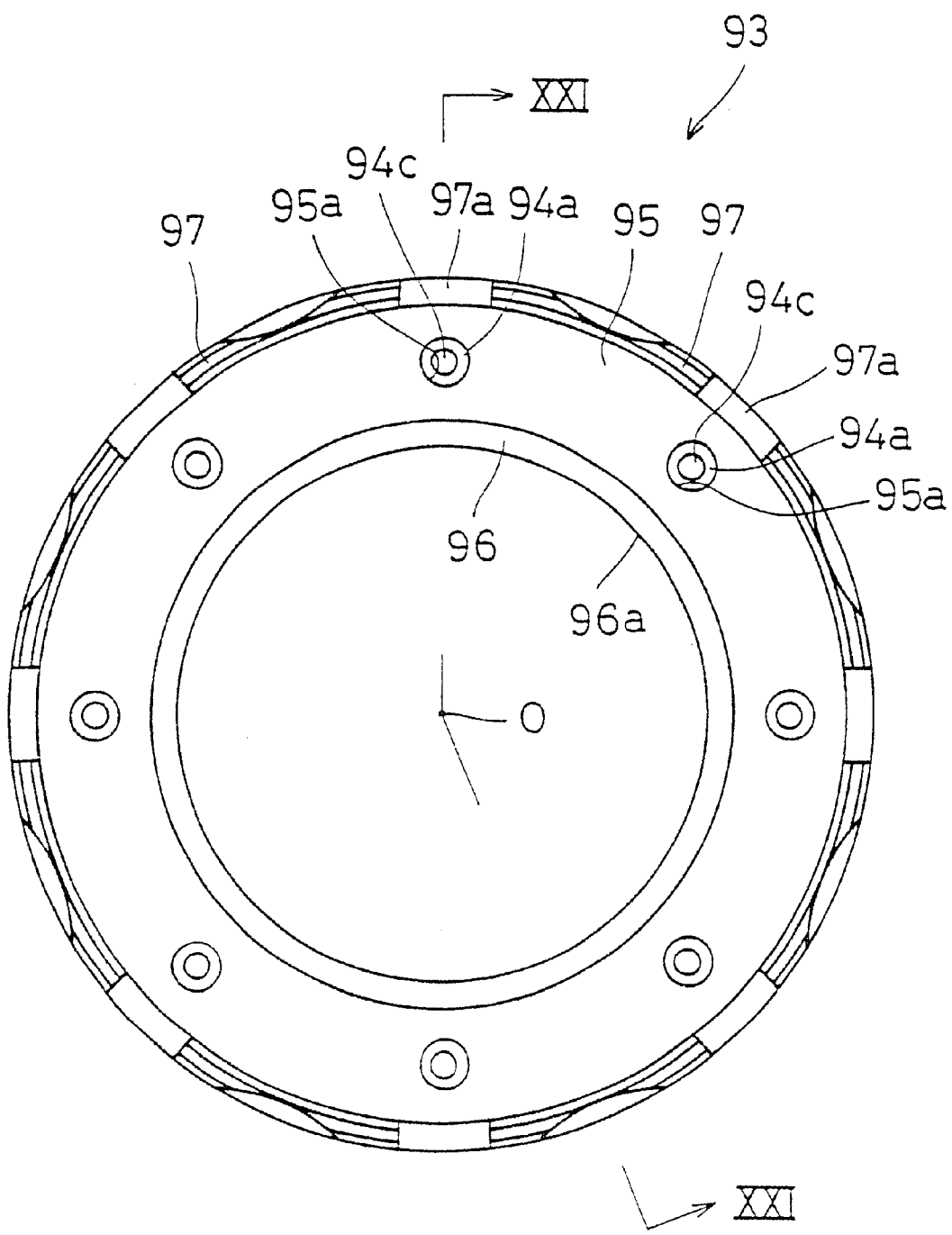
FIG. 20 is a front side elevational view of a friction bushing for use with the clutch disk assembly illustrated in FIG. 1 in accordance with the present invention.
Figure 21:
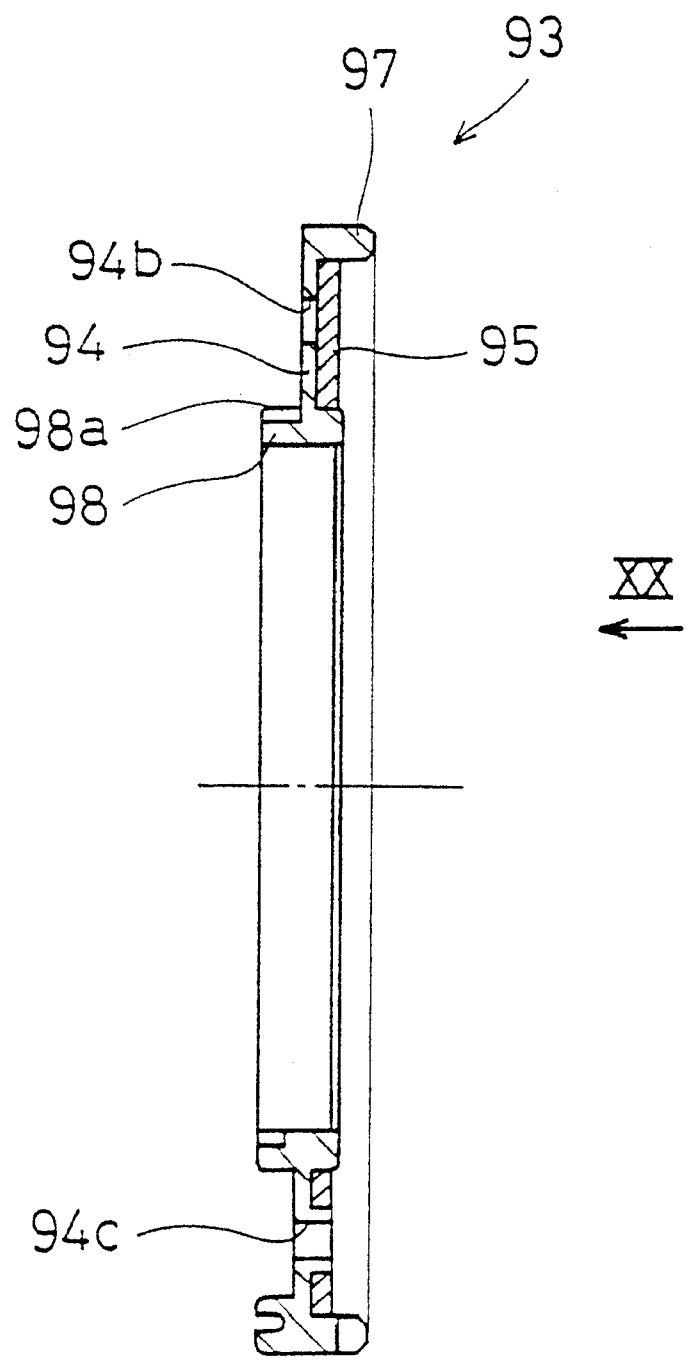
FIG. 21 is a cross sectional view of the friction bushing illustrated in FIG. 20 as viewed song section line XXI—XXI of FIG. 20.
Figure 22:
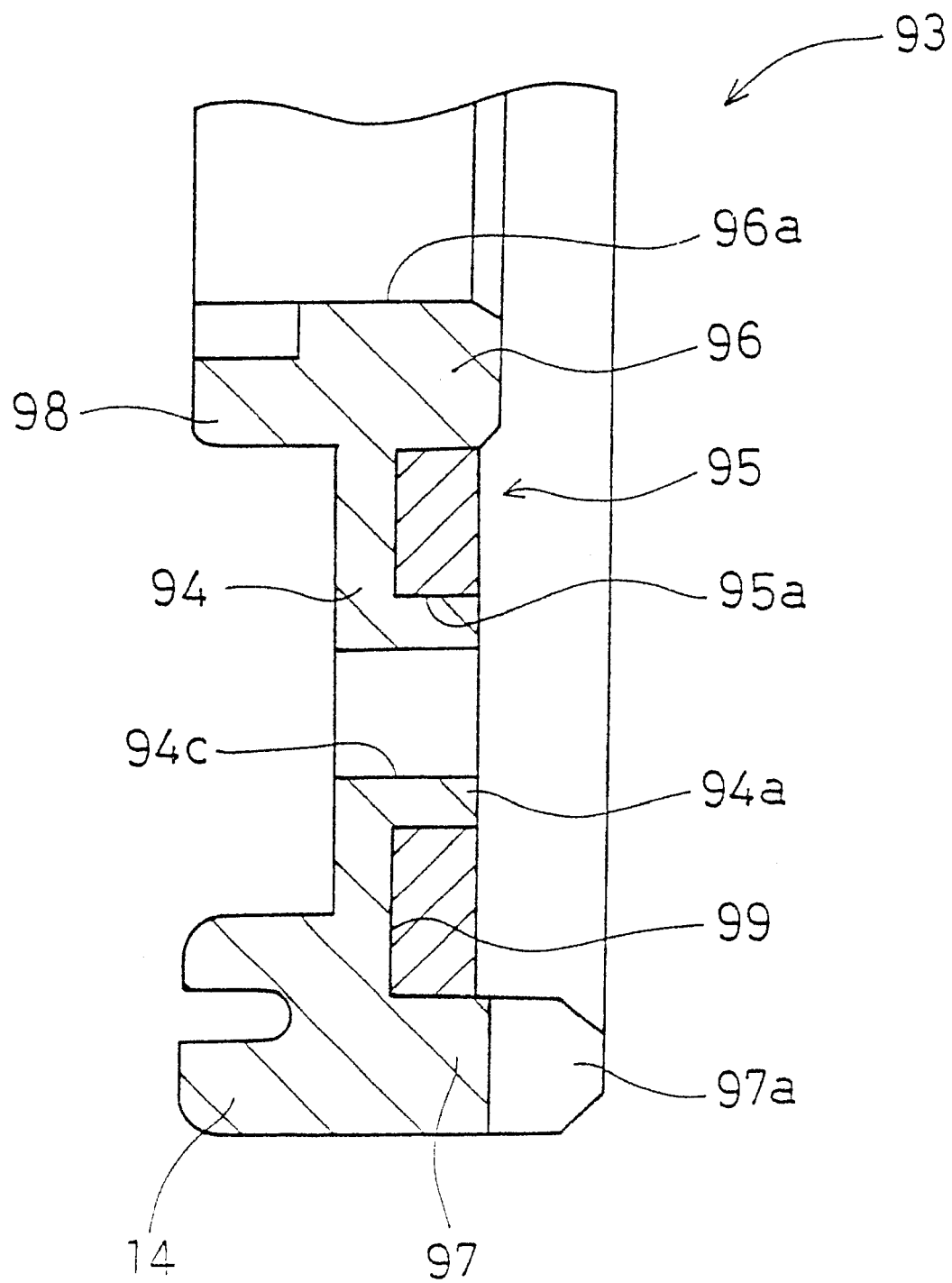
FIG. 22 is an enlarged, partial cross sectional view of a part the friction bushing illustrated in FIG. 21.

Functions of the bushing 93 includes dampening vibrations in a rotary direction by generating a friction, locating the first retaining plate 31 for the hub 3 in a radial direction, and locating the hub flange 18 for the hub 3 in a radial direction. The bushing 93, as shown in FIG. 20 to 22, includes mainly an annular resin portion 94. The annular portion 94 is a disk-shaped portion that has a predetermined width in a radial direction and a small thickness in an axial direction. The annular portion 94 is disposed between the inner circumference of the first retaining plate 31 and that of the hub flange 18 in an axial direction. An annular friction portion 95 is molded to, bonded to, or simply disposed at the annular portion 94 on the second axis side. The friction portion 95 has an annular shape, with a disk-shaped portion, which has a predetermined width in a radial direction and a small thickness in an axial direction. The friction portion 95 is made of a material with a high friction coefficient, for example, a rubber type material, a glass type mixed fiber spinning or impregnated compact or a ceramic. The friction portion 95 gives a characteristic of a high friction coefficient to the bushing 93. The magnitude of its friction can be adjusted by selecting the material of friction portion 95.

As shown in a plan view of FIG. 20, the inner and outer diameters of the annular portion 94 and the friction portion 95 are circular. The friction portion 95 can be thought to be disposed so as to touch the side face of the annular portion 94 on the second axis side, or thought to be disposed within a channel, which is formed at the side face of the annular portion 94 on the second axis side. In other words, a cylinder 30 shaped part 96 extends toward the second axis side, and is formed at the inner circumferential edge of the annular portion 94, with a cylinder-shaped part 97 extending toward the second axis side at its outer circumferential edge. An annular space surrounded by the cylinder-shaped portions 96 and 97 forms a channel of the annular portion 94. An inner and outer diameters of the channel are circular, and the friction portion 95 is disposed within the channel.

The cylinder-shaped portion 96 touches the side face of the flange 64 of the hub 3 on the first axis side as seen in FIG. 4. This portion rubs within a range of the first step of the torsion. The friction portion 95 touches the cylinder-shaped portion 59 of the hub flange 18 and the end face of the internal teeth 61 on the first axis side. This portion rubs within a range of the second step of the torsion. A small gap is secured between the friction portion 95 and the side face of the external teeth 65 of the hub 3 on the first axis side. The cylinder-shaped portion 59 of the hub flange 18 and the end face of the internal teeth 61 on the first axis side touch only the friction portion 95 in an axial direction.

Several holes 95a are formed side by side in a circular direction at the friction portion 95, and projections 94a of the annular portion 94 are inserted in the holes 95a. In this way, a whirl stop between the annular portion 94 and the friction portion 95 is performed. Particularly, since the friction portion 95 has a circular shape, such a whirl stop plays an important role. In the conventional friction portion, when it has a circular shape, there is a possibility to cause a problem concerning its strength, such as a peeling by adhering to a backboard made of SPCC. Therefore, in the conventional friction portion, a whirl stop is performed by using a friction portion with a square shape. While the friction portion 95 in accordance with the present invention has a simple structure with a circular shape, it does not have a problem such as a peeling. Particularly, it is easy to form the holes 95i a l of the friction portion 95 and to form the projections 94i a l of the annular resin portion 94, resulting in a reduction of a cost.

In the present embodiment, since the friction portion 95 is not fixedly coupled to the annular portion 94, the friction portion 95 can come off in an axial direction.

Therefore, a working such as a bonding is not necessary. However, in this embodiment in accordance with the present invention, the friction portion 95 may be bonded to the annual portion 94.

Several holes 94b are formed side by side in a circular direction in the annual portion 94. The holes 94b extend in an axial direction. The holes 94b connect the first axis side and second axis side of the annular portion 94, and expose a part of the side face of the friction portion 95 on the first axis side. As seen in FIG. 3, holes 13 are formed at the inner circumference of the first retaining plate 31, corresponding to the holes 94b. The holes 13 have a diameter larger than that of the holes 94b, and expand to the circumference of the holes 94b. Thus, a part of the friction portion 95 is exposed to the outside of the clutch disk assembly 1 through the holes 94b and the holes 13 which are formed at the identical position. Therefore, the friction portion 95 is cooled sufficiently, in other words the friction portion 95 radiates a heat to an atmosphere on the first retaining plate 31 side, resulting in a prevention of a change of a friction characteristic by a friction heat of the friction portion 95. The endurance strength of the friction portion 95 is improved, and a fall of a hardness of the hub 3 and the hub flange 18 is prevented. In addition, holes 94c are formed that extend in an axial direction and penetrate the projections 94a. The holes 94c connect the first and second axis sides of the annular portion 94. The holes 94b and 94c reduce a total volume of the bushing 93, resulting in a reduction of an amount of a resin used and a reduction of a cost.

A cylinder-shaped part 98 extending toward the first axis side is formed at the inner circumferential edge of the annular portion 94. The inner circumferential face of the cylinder-shaped portions 96 and 98 touches the outer circumferential face of the boss 62. In this way, a positioning (centering) of the first retaining plate 31 and the second retaining plate 32 against the hub 3 in a radial direction is performed. In addition, a channel 98a connecting with a plurality of projections which are formed at the inner circumferential edge of the first retaining plate 31 are formed at the outer circumferential face of the cylinder-shaped portion 98. In this way, the bushing 93 rotates together with the first retaining plate 31 in a body, and can rub the flange 64 of the hub 3 and the cylinder-shaped portion 59 of the hub flange 18.

Pluralities of cutouts 97a are formed at the cylinder-shaped portion 97. The internal side face of the cylinder-shaped portion 97 in a radial direction touches the outer circumferential face on the first axis side of the cylinder-shaped portion 59 of 30 the hub flange 18. In other words, the hub flange 18 is positioned by the cylinder-shaped portion 97 of the bushing 93 in a radial direction against the hub 3, the first retaining plate 31 and the second retaining plate 32.

Pluralities of connecting parts 14 extending toward the first axis side are formed at the outer circumferential edge of the annular portion 94. The connecting parts 14 are formed at equal intervals in a circular direction. The connecting parts 14 have nail like shapes, and are connected with a hole 15 which is formed at the first retaining plate 31 as seen in FIG. 4. Thus, the bushing 93 is temporarily connected with the first retaining plate 31 in an axial direction.

The bushing 93 mentioned above positions the first retaining plate 31 against the hub 3 in a radial direction by touching the outer circumferential face of the boss 62, and generates a hysteresis torque of the first and second steps by a friction face touching each of the flange 64 and the cylinder-shaped part 59. Thus, a single portion has a plurality of functions, resulting in a reduced number of total parts.

When the clutch disk 33 of the input rotary portion 2 is pressed against a flywheel (not shown in the Figures), a torque is input to the clutch disk assembly 1. The torque is then transmitted from the first retaining plate 31 and the second retaining plate 32 to the first spring 16, the hub flange 18, the spacer 80, the fixing plate 20, the second spring 21 and the bushing 19 in this order. Finally, the torque is output from the hub 3 to a transmission shaft (not shown in the Figures).

When a torque fluctuation from an engine is input to the clutch disk assembly 1, a torsion vibration or relative rotation is caused between the input rotary portion 2 and the hub 3, and the first springs 16, the springs 17 and the second springs 21 are compressed in a rotary direction.

Figure 7:
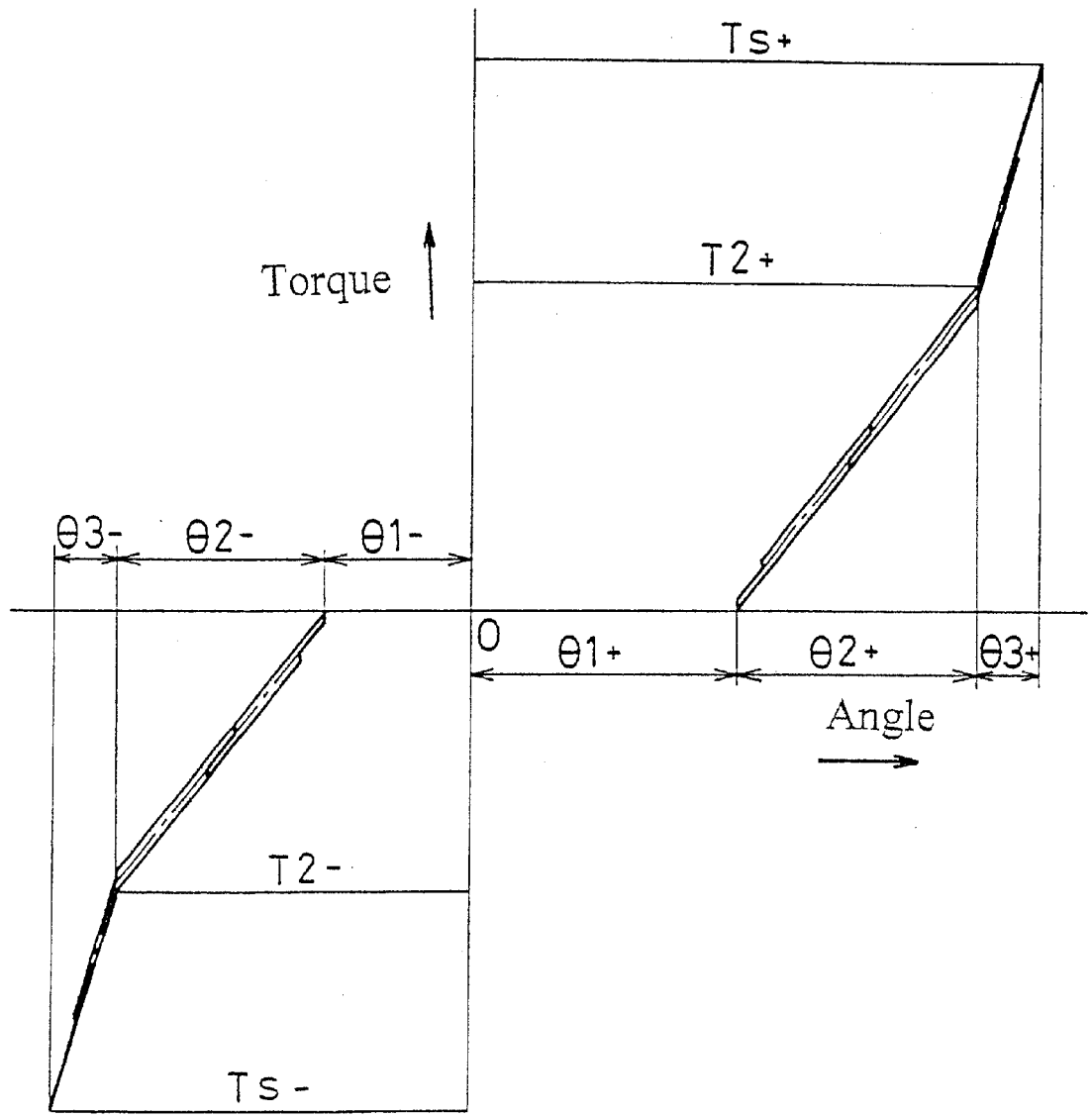
FIG. 7 shows a torsion characteristic curve of the clutch disk assembly in accordance present invention.

Referring to a machine circuit in FIG. 6 and a torsion characteristic curve in FIG. 7, an operation of the clutch disk assembly 1 as a dampening mechanism will now be described in more detail. The machine circuit shown in FIG. 6 indicates a schematic view of a dampening mechanism 4 formed between the input rotary portion 2 and the hub 3. In FIG. 6, an operating relation between portions will now be described, for example, when the hub 3 is twisted in a certain direction (for example, R2 direction) against the input rotary portion 2.

When the hub 3 is twisted in a R2 direction against the input rotary portion 2, mainly the second dampening mechanism 6 operates within a range of a torsion angle $\theta_1$. In other words, the second springs 21 are compressed in a rotary direction, causing a rubbing in the second friction mechanism 10. In this case, since a rubbing is not caused in the first friction mechanism 8, a characteristic of a high hysteresis torque can not be obtained. As, a result, a characteristic of the first step of a low rigidity and low hysteresis torque is obtained. When the torsion angle is over the torsion angle $\theta_1$, the second stopper 12 touches, resulting in a stop of a relative rotation between the hub 3 and the hub flange 18. In other words, the second dampening mechanism 6 does not operate when the torsion angle is over $\theta_1$. Thus, the second springs 21 are not compressed when the torsion angle is over $\theta_1$. Therefore, the second springs 21 are not likely to be broken. In addition, it is not necessary to consider the strengths of the second springs 21, which leads to an easy design. The first dampening mechanism 5 operates at the second step of a torsion characteristic. In other words, the first springs 16 are compressed in a rotary direction between the hub flange 18 and the input rotary portion 2, resulting in a rubbing in the first friction mechanism 8. As a result, a characteristic of the second step of a high rigidity and high hysteresis torque is obtained. When the torsion angle is over $\theta_1+\theta_2$, .the end part of the springs 17 in a circular direction touches the second supporting part 37 of the second receptacle 36. In other words, in the second dampening mechanism 6, the first springs 16 and the springs 17 are compressed in parallel. As a result, a rigidity of the third step is higher than that of the second step. When the torsion angle is $\theta_1+\theta_2+\theta_3$, the first stopper 11 touches, resulting in a stop of a relative rotation between the input rotary portion 2 and the hub 3.

In a negative side of a torsion characteristic, a similar characteristic is obtained although a magnitude of each torsion angle ($\theta_1$, $\theta_2$, and $\theta_3$) is different. At the first step of a torsion characteristic, a friction is generated between the bushing 93 and both the flange 64 of the hub 3 and the external teeth 65. At the second and third steps, a friction is generated between the bushing 93 and the inner circumference of the hub flange 18.

When an abrasion of the bushing 19 progresses at a friction face between the annual portion 89 and the second disk-shaped portion 73 in the second dampening mechanism 6, it is thought that the bushing 19 moves from other portions toward the second axis side. If this happens, a posture of the second cone spring 78 changes, in particular, it arises. As a result, an urging force (setting load) of the second cone spring 78 changes. In particular, it once increases and then decreases. Thus, a magnitude of a hysteresis torque in the second friction mechanism 10 changes and is not stable.

In the present invention, however, the first cone spring 49 urges the fixing plate 20 toward the first axis side, and its urging force is applied to the hub flange 18 and the bushing 93. Therefore, when an amount of abrasion in the second friction mechanism 10 corresponds to or coincides with an amount of abrasion at a friction face between the bushing 93 and the hub flange 18, the following results can be obtained. When a part (the friction portion 95) of the bushing 93 corresponding to the cylinder-shaped part 59 of the hub flange 18 abrades, the hub flange 18, the spacer 80, the fixing plate 20 and the first friction washer 48 all move toward the first axis side corresponding to an amount of the abrasion. As a result, at the friction face in the second friction mechanism 10, the second disk-shaped portion 73 moves toward the first axis side. The location of the bushing 19 against the hub 3 in an axial direction hardly changes. Therefore, a posture of the second cone spring 78 which is disposed between the flange 64 and the bushing 19 hardly changes. Thus, an abrasion following mechanism using the hub flange 18 and the first friction mechanism 8 keeps a posture of the second cone spring 78 constant, regardless of an abrasion at the friction face of the second friction mechanism 10, resulting in a stable generation of a hysteresis torque in the second friction mechanism 10. As a result, a hysteresis torque that shows a small change with the passage of time can be obtained, leading to an improved sound and vibration performance. In addition, since it is not necessary to consider an abrasion margin of the second cone spring 78, the degree of freedom to design the second cone spring 78 increases. In particular, it is possible to design the second cone spring 78 with a low stress and a high load. A set load of the second cone spring 78 is set to be approximately a peak of a load characteristic in a cone spring. When an amount of abrasion in the bushing 19 is kept to be equal to that in the bushing 93, the load of the second cone spring 78 is kept to be approximately a maximum. When an amount of abrasion in the bushing 19 is different from that in the bushing 93, the set load shifts slightly from a peak of a load characteristic to both its side. In this case, an amount of variation of a set load is set so as to be a minimum, in addition its amount is predictable.

Another Embodiment

Figure 23:
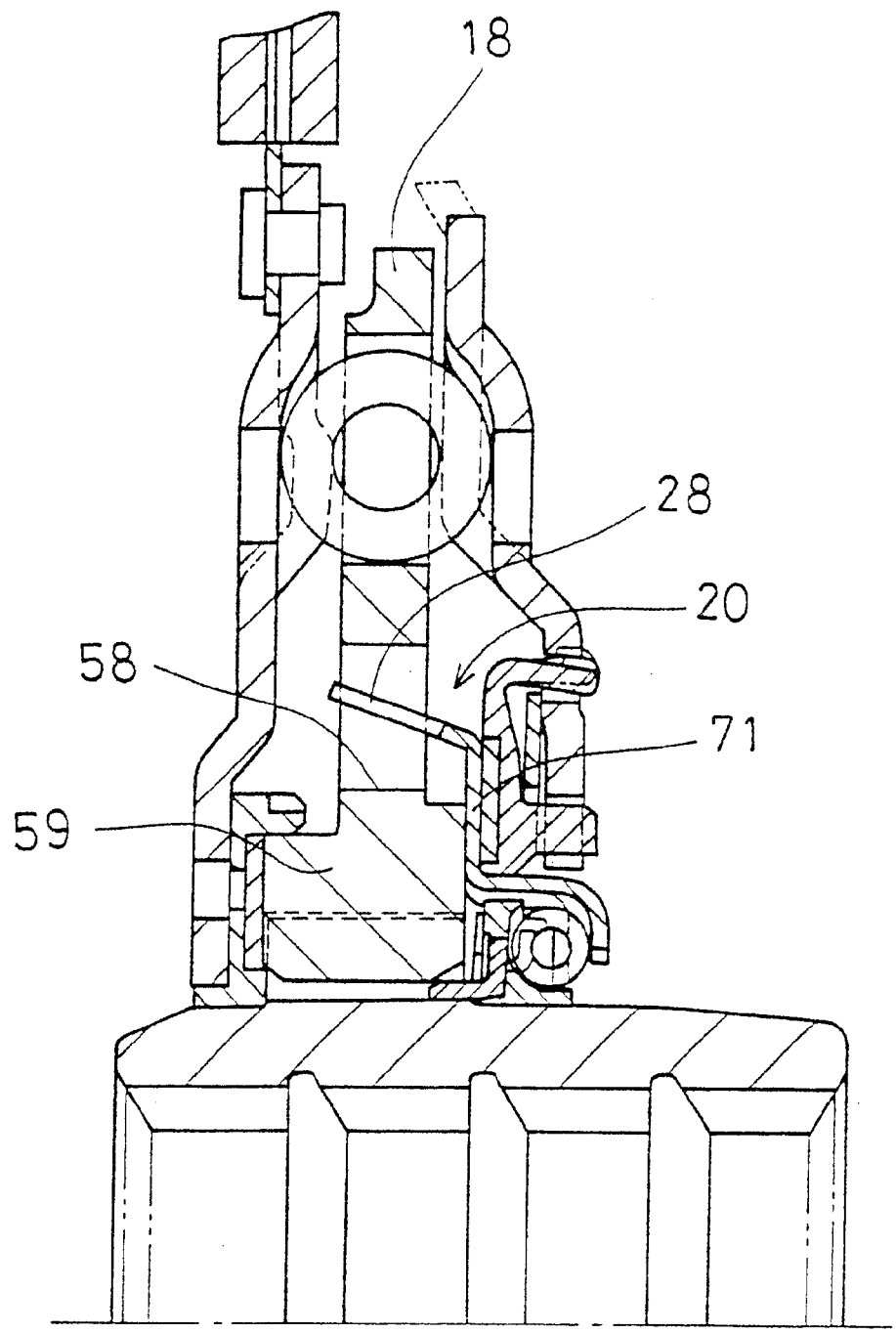
FIG. 23 is a partial cross sectional view of a part of a clutch disk assembly in accordance with another embodiment of the present invention, corresponding to FIG. 3 of the first embodiment.

As shown in FIG. 23, the spacer described in the above embodiment can be removed, and fixing plate 20 may be connected directly with hub flange 18. A first-disk like part 71 of fixing plate 20 is supported directly by cylinder-like part 59 of a hub flange 18. In addition, a connecting nail 28 extends from the outer circumferential edge of the first disk-like part 71 into a connecting hole 58 of the hub flange 18. Because a spacer can be removed, the result is a smaller number of parts.

In the machine circuit in FIG. 6, some other elastic portion or a spring may be disposed at the location of a spacer 80. In the present embodiment, the phrases "connect so as to rotate in a body" and "connect relatively unrotatably" mean that both portions are able to transmit torque in a circular direction. This embodiment also contains a condition in which a gap is formed in a rotary direction between the two portions. Within a predetermined angle, a torque is not transmitted between the two portions.

The Second Receptacles 36 (Rectangular Window)

Referring to FIGS. 24 to 29, the second receptacles 36 that are formed in the second retaining plate 32 will now be described in more detail. The second receptacles 36 are spring supporting portions formed in the first retaining plate 31 and the second retaining plate 32. The second receptacles 36 that are formed in the first retaining plate 31 are substantially identical to those formed in the second retaining plate 32. Thus, the following description of the second receptacles 36 formed in the second retaining plate 32 applies to each of the second receptacles 36 whether they are formed in either the first retaining plate 31 or the second retaining plate 32. In other words, although the following description will repeatedly refer to a single one of the second receptacles 36 formed in the second retaining plate 32, this description applies to all of the receptacles 36.

Each second receptacle 36 is formed to project outwardly in an axial direction from the main body of the second retaining plate 32. Therefore, the second receptacles 36 are rectangular windows of a so-called tunnel-type, which continues in a radial direction.

Each second receptacle 36 mainly includes an axially supporting part 36a. The axially supporting part 36a is a portion of the second retaining plate 32, which projects in an axial direction so as to form a spring seat for the first spring 16. The axially supporting part 36a continues in a radial direction to form a coil spring support for supporting an axially outside part of the first spring 16. The axially supporting part 36a has an arc-like cross section that substantially corresponds to the shape of the first spring 16, which is a coil spring. The axially supporting part 36a supports the transmission ends of the first spring 16 in an axial direction, and supports the radially outside part of the first spring 16.

A hole 36b is formed at the radially central part of the axially supporting part 36a. The hole 36b has an approximately trapezoid-like shape in which its radially outside part has a length in a circular direction smaller than that of its radially inside part.

Both circular end parts of the second receptacles 36 are cut and lifted in an axial direction. In other words, the second receptacles 36 are set off from the main body of the first retaining plate 31 or the second retaining plate 32. As a result, openings 36e and 36f are formed in the rotational direction on both sides of the second receptacle 36. The end faces of the second receptacles 36 of the plate main body form a pair of second supporting parts 37. The second supporting parts 37 touch both ends of the first spring 16 in a circular direction. The reason why both ends of the second receptacle 36 are cut off from the plate main body is to have a large "cut and lift" angle from the plate main body. This large angle exists in order to seat the first spring 16 with a large diameter in the second receptacle 36. When the coil spring 16 has a relatively small diameter, both ends of the second receptacle 36 do not need to be cut off. Rather, the axially supporting part 36a can be connected continuously with the plate main body. For this reason, the part that supports both circular end parts of the coil spring 16 can be larger in the rectangular windows formed by the second receptacles 36.

Figure 24:
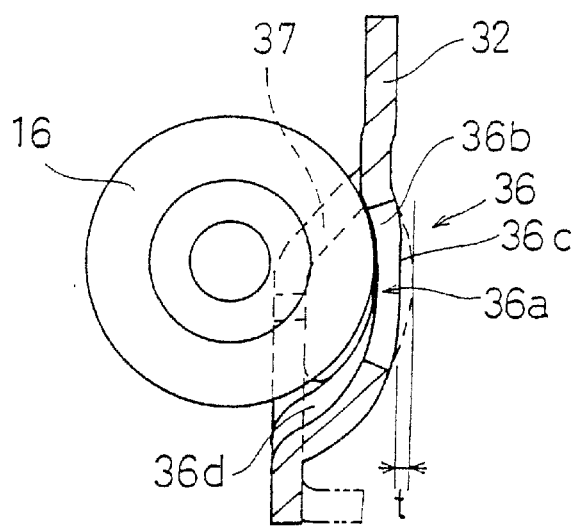
FIG. 24 is a partial cross sectional view showing a connection between a retaining plate and a first spring.

As shown in FIG. 24, in the axially supporting part 36a, the thickness of the portion of the axially supporting part 36a that projects the most outwardly in an axial direction is smaller than that of other portions of the plate main body. Specifically, the thickness of the outer portion of the axially supporting part 36a is smaller by distance "t" than the thickness of a conventional plate. The axially outside portion of the axially supporting part 36a has a flat surface 36c formed along this thinner portion.

Figure 25:
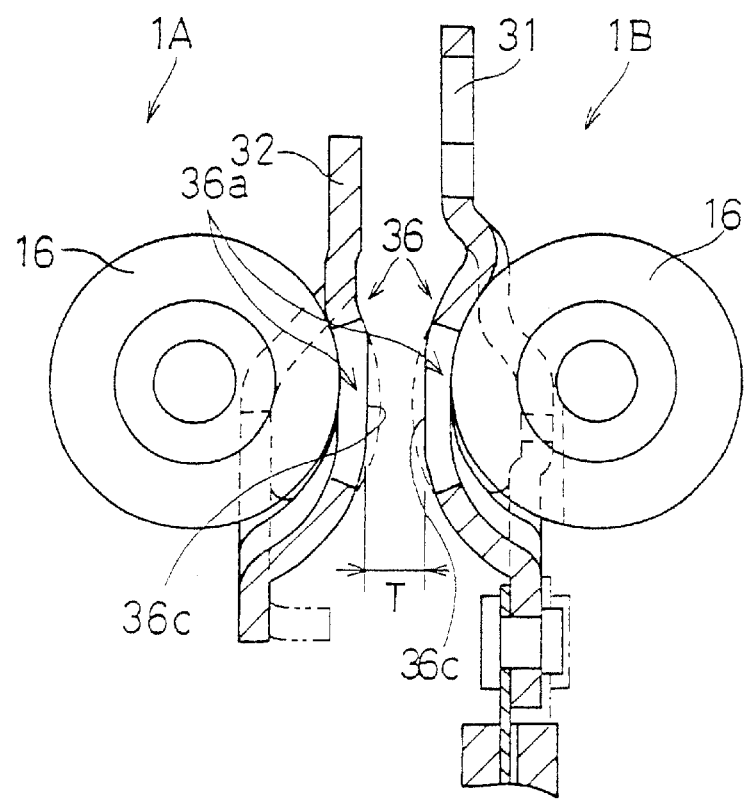
FIG. 25 is a partial cross sectional view when a clutch disk assembly is used for a twin clutch.

Since the outer portion of the axially supporting parts 36a of the second retaining plate 32 do not project outwardly in an axial direction as far as conventional supporting parts, axially supporting parts 36a do not interfere with other portions of the clutch. This is particularly the case in a twin clutch in which two clutch disk assemblies IA and IB are disposed in an axial direction as shown in FIG. 25. The gap "T" between adjacent second receptacles 36 in an axial direction can be larger than the gap of a conventional twin clutch. As a result, even if an abrasion of the friction facing occurs, the clutch disk assemblies IA and IB will not interfere with each other.

By changing the thickness of the axially supporting part 36a, the axial width of second retaining plate 32 is reduced. Therefore, it is not necessary to reduce the diameters of the first springs 16. In other words, the problem mentioned above can be solved while keeping the diameter of the first spring 16 as large as possible.

The thin axially supporting part 36a can be made by grinding or machining a conventional retaining plate. The axially supporting part 36a can also be made by press-working, or casting. Since additional grinding or machining of the plate is not necessary, lower cost results.

The clutch disk assembly, using the plate in which the thickness of the axially supporting part 36a is reduced, can be used both for a single-type and for a twin-type clutch arrangement. Thus, it is not necessary to produce a special clutch disk assembly for a twin clutch arrangement. This results in reducing total manufacturing costs.

Figure 28:
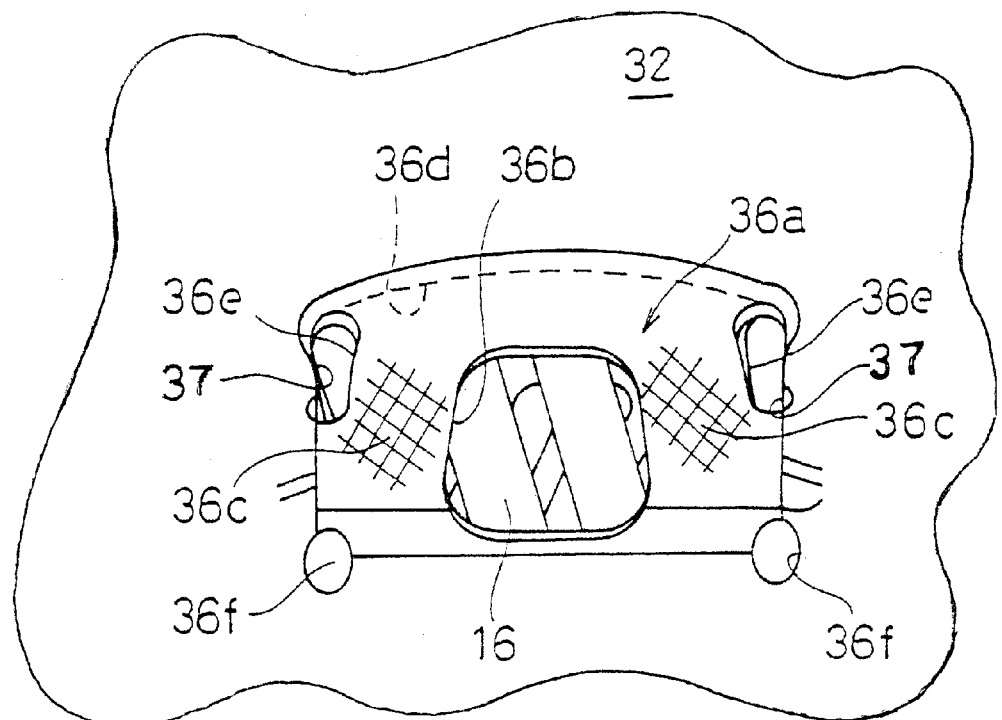
FIG. 28 is a plan view of one of the second receptacles for the retaining plate.

As shown in FIG. 28, a first hole 36e is formed at the radially outside part of both circular side parts in the axially supporting part 36a. Each of the first holes 36e has an elliptical or oval shape with its long axis extending in a radial direction. Each of the first holes 36e also has a cut-out shape which opens to the outside in a circular direction.

A second hole 36f is formed at the radially inside part (both corner parts on the inner circumferential side) of both circular side parts in the axially supporting part 36a. The second hole 36f extends over both the axially supporting part 36a and the plate main body.

Each of the second holes 36f has its long axis extending in a radial direction. More specifically, the second holes 36f extend longitudinally in the same direction as the circular end part of the axially supporting part 36a or the second supporting part 37 extends.

A method of forming the second receptacles 36 (rectangular window) will now be described in more detail. The holes 36b, and first and second holes 36i e 1 and 36f are formed in the plate main body of the second retaining plate 32 before bending of the plate main body of the retaining plate. The axially supporting part 36a is formed to project outwardly from the plate main body in an axial direction by a conventional pressing or lifting method. The inner circumferential portion of the axially supporting part 36a is bent further out of the plane of the plate main body than the outer circumferential portion of the axially supporting part 36a. Thus, a larger lift angle is formed at the inner angle lifted from the circumference such that more material is needed to sufficiently extend the second receptacle 36. In the present embodiment, the second holes 36f are formed at the inner circumferential corners of the rectangular window or second receptacle 36. In addition, the second holes 36f extend radially to allow a large lift angle of the axially supporting part 36a at its inner circumferential portion. The result is that, during manufacture of the rectangular window of the second receptacle 36, cracking seldom occurs. Also, during use of the device, when torque is applied to the rectangular window of the second receptacle, cracking seldom occurs.

Figure 29:
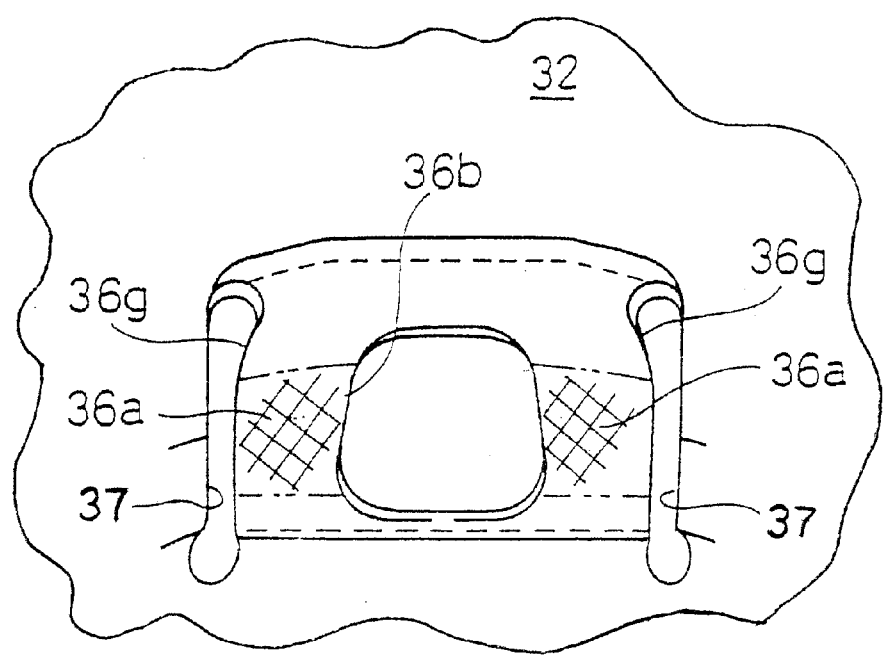
FIG. 29 is a view in another embodiment of a second receptacle for a plate that is similar to the one illustrated in FIG. 28.

Referring now to FIG. 29, the structure of another embodiment of second retaining plate 32 will now be discussed. In this embodiment, a large hole 36g is formed at each end of the second receptacle 36. The holes 36g extend longitudinally in a radial direction. In other words, holes 36g are formed at both circular end parts of the axially supporting part 36a. The holes 36g extend completely over the axially supporting part 36a in a radial direction. Both radial end parts of the holes 36g have a round shape, which is larger than the rest of hole 36g. The hole 36g has a cutout shape in which both circular side parts are open. The radial inside end of the hole 36g further extends from the axially supporting part 36a to the inside in a radial direction, and is formed as a part of the plate main body. This cutout of hole 36g leads to a similar effect to that obtained in the second receptacle 36 in FIG. 28.

Figure 26:
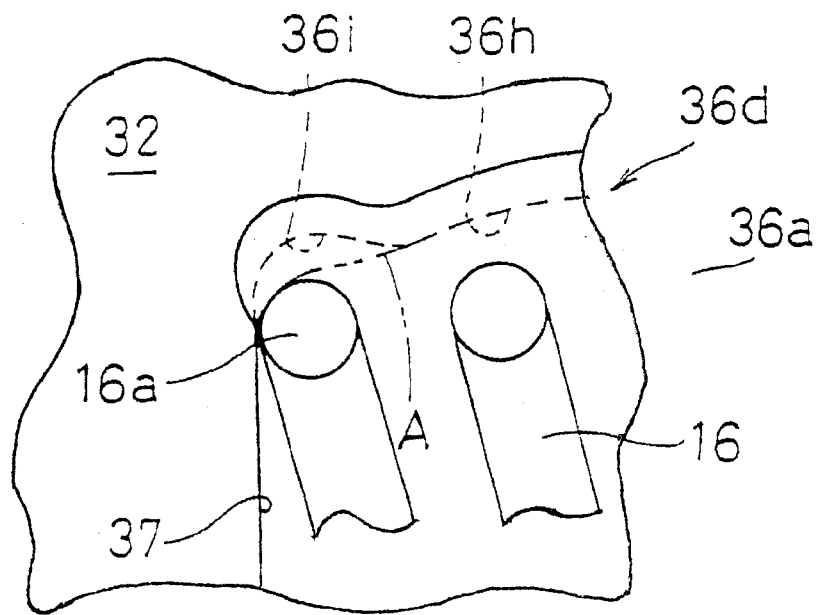
FIG. 26 is a partial plan view showing a radially outside supporting part of a second receptacle.
Figure 27:
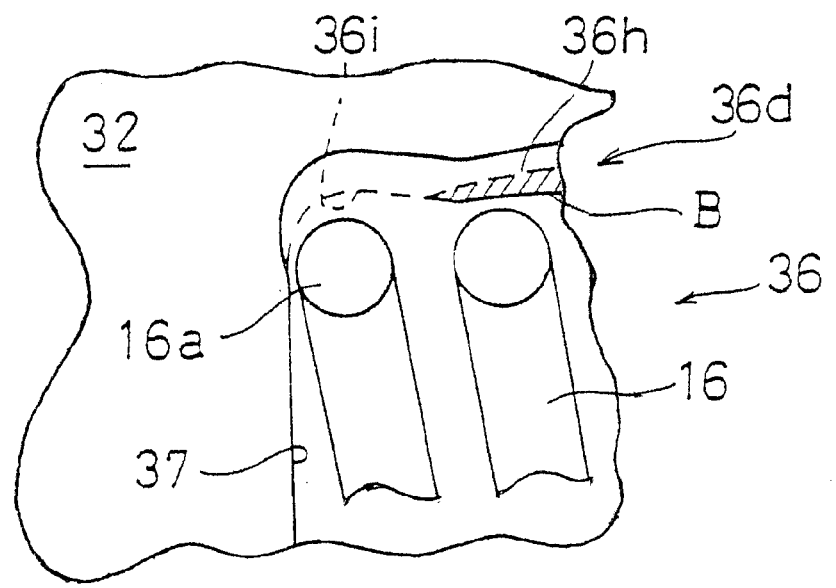
FIG. 27 is a partial plan view showing advanced abrasion of the radially outside supporting part of the second receptacle illustrated in FIG. 26.

As shown in FIG. 26, the radial outside of axially supporting part 36a is supporting part 36d, which supports the radial outside of the first spring 16. A gap is formed in a radial direction between the radially outside supporting part 36d and the radially outside part of the first spring 16. The radially outside supporting part 36d includes an intermediate part 36h located at the intermediate section in a circular direction, and a circular end part 36i which is formed at both sides of the intermediate part 36h in a circular direction. The intermediate part 36h extends in an arc like shape along an orbit "A" which is formed when the first spring 16 is compressed. The circular end part 36i is formed so as to project outwardly in a radial direction from the intermediate part 36h. In other words, the circular end part 36i is located outwardly in a radial direction from the orbit "A" of the first spring 16. The circular end part 36i is formed corresponding to an end turn 16a (one turn at both circular end parts) of the first spring 16, and is radially spaced apart from the outside part of the end turn 16a In the structure mentioned above, when the first spring 16 is compressed, the first spring 16 rubs the second receptacle 36. At that time, a centrifugal force moves the first spring 16 outwardly in a radial direction, the first spring 16 rubs the radially outside supporting part 36d. In particular, the first spring 16 mainly rubs the intermediate part 36h, resulting in an abrasion thereof. For example, the first spring 16 rubs against a shaded part B as shown in FIG. 27. However, since the first spring 16 does not rub the circular side part 36i, the thickness of the radially outside corner part of the second receptacle 36 does not change. In other words, the strength of the radially outside corner part of the second receptacle 36 is maintained. For this reason, the corner part of the second receptacle 36 is less likely to form cracks. The result is that the life span of the plates 31 and 32 can be extended.

In a plate used for a dampening disk assembly relating to the present invention, both circular end parts of a second supporting part to support a radially outside part of a coil spring is located outward in a radial direction from a circular intermediate part. Therefore, when the coil spring operates, the coil spring barely rubs both circular end parts. As a result, the thickness of both circular end parts of the second supporting part is secured, resulting in maintaining its strength.

While several embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A spring retaining plate for use with a dampening disk assembly to support at least one coil spring, said spring retaining plate comprising:

a plate main body having a disk shaper, a spring supporting portion including an axially supporting part, said axially supporting part continuously projecting from said plate main body in an axial direction, continuing in a radial direction to form a spring seat for supporting an axially outside part of the coil spring, said axially supporting part having a pair of end portions with inner and outer circumferential sides extending between said end portions; and an elongated hole being formed at radially inner circumferential corners of said axially supporting parts, said elongated hole being formed in a portion where said axially supporting part and said plate body.

2. A spring retaining plate as set forth in claim 1, wherein each of said elongated holes extends over said axially supporting part and said plate main body.

3. A spring retaining plate as set forth in claims 1, wherein said elongated holes extend in substantially in a radial direction.

4. A spring retaining plate as set forth in claim 2, wherein said elongated holes extend in substantially in a radial direction.

5. A spring retaining plate as set forth in claim 2, wherein said elongated holes have an oval shape.

6. A spring retaining plate as set forth in claim 3, wherein said elongated holes have an oval shape.

7. A spring retaining plate as set forth in claim 1, wherein several of said spring supporting portions are formed in said plate main body with each of said spring supporting portions having said axially supporting part, said end portions and said elongated holes.

8. A spring retaining plate as set forth in claim 7, wherein said spring supporting portions are arranged in a circular pattern.

9. A spring retaining plate as set forth in claim 8, wherein each of said elongated holes extends over said axially supporting part and said plate main body.

10. A spring retaining plate as set forth in claim 9, wherein each of said elongated holes extends in a substantially radial direction.

11. A spring retaining plate as set forth in claim 10, wherein said elongated holes have an oval shape.

12. A spring retaining plate as set forth in claim 10, further comprising additional holes extending over said axially supporting parts and said plate main body.

13. A spring retaining plate as set forth in claim 12, wherein said additional holes are radially elongated.

14. A spring retaining plate as set forth in claim 1, wherein said elongated holes extend radially from said inner circumferential side to said outer circumferential side.

15. A spring retaining plate as set forth in claim 14, wherein each of said elongated holes has an inner radial end, a middle radial section and an outer radial end with said inner and outer radial ends being wider than said middle radial section.

16. A spring retaining plate as set forth in claim 15, wherein each of said elongated holes extends over said axially supporting part and said plate main body at said inner circumferential side.

17. A spring retaining plate as set forth in claim 14, wherein several of said spring supporting portions are formed in said plate main body with each of said spring supporting portions having said axially supporting parts.

18. A spring retaining plate as set forth in claim 17, wherein each of said elongated holes has an inner radial end, a middle radial section and an outer radial end with said inner and outer radial ends being wider than said middle radial section.

19. A spring retaining plate as set forth in claim 18, wherein each of said elongated holes extends over said axially supporting part and said plate main body at said inner circumferential side.

20. A spring retaining plate as set forth in claim 17, wherein said spring supporting portions are arranged in a circular pattern.

21. A dampening disk assembly comprising:

a pair of spring retaining plates fixedly coupled to each other to form a coil spring receiving space therebetween, with each of said spring retaining plates having a plate main body with a disk shape, a centrally located attachment portion formed in said plate main body and at least one spring supporting portion formed in said plate main body which is radially spaced from said centrally located attachment portion;

a central hub located between said spring retaining plates and rotatably coupled to said centrally located attachment portions of said spring retaining plates; and at least one coil spring having a pair of circular ends supported by said spring supporting portions of said spring retaining plates and said hub to elastically couple said spring retaining plates to said hub in a rotary direction, said at least one spring supporting portion of at least one of said spring retaining plates including an axially supporting part and an end supporting part, said axially supporting part continuously projecting from said plate main body in an axial direction, continuing in a radial direction to form a spring seat for supporting an axially outside part of the coil spring, said axially supporting part having a pair of end portions with inner and outer circumferential sides extending between said end portions; and an elongated hole being formed at inner circumferential corners of said axially supporting parts, said elongated hole being formed in a portion where said axially supporting part projects axially from said plate body and a radial boarder between said axially supporting part and said plate body.

22. A dampening disk assembly as set forth in claim 21, wherein each of said elongated holes extends over said axially supporting part and said plate main body.

23. A dampening disk assembly as set forth in claim 21, wherein each of said elongated holes extends along a direction which is substantially the same direction of said end portions.

24. A dampening disk assembly as set forth in claim 21, wherein said elongated holes extend in a substantially radial direction.

25. A dampening disk assembly as set forth in claim 24, wherein said holes have an oval shape.

26. A dampening disk assembly as set forth in claim 21, wherein several of said spring supporting portions are formed in said plate main body with each of said spring supporting portions having said axially supporting parts, said end portions and said elongated holes.

27. A dampening disk assembly as set forth in claim 26, wherein said spring supporting portions are arranged in a circular pattern.

28. A dampening disk assembly as set forth in claim 27, wherein each of said elongated holes extends over said axially supporting part and said plate main body.

29. A dampening disk assembly as set forth in claim 28, wherein each of said elongated holes extends in a substantially radial direction.

30. A dampening disk assembly as set forth in claim 29, wherein said elongated holes have an oval shape.

31. A dampening disk assembly as set forth in claim 29, further comprising additional holes extending over said axially supporting parts and said plate main body.

32. A dampening disk assembly as set forth in claim 31, wherein said additional holes are radially elongated.

33. A dampening disk assembly as set forth in claim 21, wherein said elongated holes extend radially from said inner circumferential side to said outer circumferential side.

34. A dampening disk assembly as set forth in claim 33, wherein each of said elongated holes has an inner radial end, a middle radial section and an outer radial end with said inner and outer radial ends being wider than said middle radial section.

35. A dampening disk assembly as set forth in claim 34, wherein each of said elongated holes extends over said axially supporting part and said plate main body at said inner circumferential side.

* * * * *